(12) United States Patent
Hosoi et al.

(10) Patent No.: US 12,655,324 B2
(45) Date of Patent: Jun. 16, 2026

(54) SEAL MEMBER

(71) Applicant: YOSHINO GYPSUM CO., LTD., Tokyo (JP)

(72) Inventors: Kiyoshi Hosoi, Shizuoka (JP); Tomoki Furue, Shizuoka (JP); Yuuya Ishizaka, Shizuoka (JP); Wataru Ohuchi, Tokyo (JP); Takuji Yamashita, Tokyo (JP); Shun Tsukamoto, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 18/701,008

(22) PCT Filed: Oct. 13, 2022

(86) PCT No.: PCT/JP2022/038174

§ 371 (c)(1),
(2) Date: Apr. 12, 2024

(87) PCT Pub. No.: WO2023/063382

PCT Pub. Date: Apr. 20, 2023

(65) Prior Publication Data

US 2024/0409785 A1      Dec. 12, 2024

(30) Foreign Application Priority Data

Oct. 13, 2021    (JP) ................................. 2021-167865

(51) Int. Cl.
    *C09J 7/38*          (2018.01)
    *C09J 7/40*          (2018.01)
(52) U.S. Cl.
    CPC .  *C09J 7/38* (2018.01); *C09J 7/40* (2018.01); *C09J 2301/204* (2020.08);
    (Continued)

(58) Field of Classification Search
    CPC . C09J 7/38; C09J 7/40; C09J 2301/204; C09J 2301/21; C09J 2423/045;
    (Continued)

(56) References Cited

U.S. PATENT DOCUMENTS

2020/0010733 A1    1/2020  Hulteen et al.
2021/0309891 A1    10/2021  Schoenbrodt et al.

FOREIGN PATENT DOCUMENTS

JP          9-095391          4/1997
JP          11-269441          10/1999
            (Continued)

OTHER PUBLICATIONS

International Search Report issued in International Application No. PCT/JP2022/038174, dated Nov. 22, 2022.
(Continued)

*Primary Examiner* — Patricia L. Nordmeyer
(74) *Attorney, Agent, or Firm* — STAAS & HALSEY LLP

(57)          ABSTRACT

A seal member (10) fanned in a strip shape having one side as a long side in plan view, the seal member (10) comprising a substrate (11), a resin layer (12) provided to one surface of the substrate (11), and a release sheet (13) provided on the resin layer (12), the resin layer (12) including a pressure-sensitive adhesive layer (121), the pressure-sensitive adhesive layer (121) having a plurality of pressure-sensitive part rows configured from one or more pressure-sensitive parts extending in the length direction of the substrate (11), and the pressure-sensitive part rows being separated from one another in the width direction of the substrate (11).

12 Claims, 9 Drawing Sheets

(52) U.S. Cl.
CPC ...... *C09J 2301/21* (2020.08); *C09J 2423/045*
(2013.01); *C09J 2429/008* (2013.01)

(58) Field of Classification Search
CPC ............ C09J 2429/008; C09J 2203/346; C09J
2433/00; C09J 7/30; B32B 2307/54;
B32B 3/085; B32B 7/12; B32B 2307/748;
B32B 2581/00; B32B 7/06
See application file for complete search history.

(56) References Cited

FOREIGN PATENT DOCUMENTS

| | | | |
|---|---|---|---|
| JP | 2017-088768 | 5/2017 | |
| KR | 10-2018-0013747 | 2/2018 | |
| KR | 10-2019-0087422 | 7/2019 | |
| TW | 202000832 A | 1/2020 | |
| TW | 202003773 A | 1/2020 | |
| WO | WO 2017/022749 A1 | 2/2017 | |
| WO | WO-2018112130 A1 * | 6/2018 | .............. C09J 11/08 |

OTHER PUBLICATIONS

Taiwanese Office Action issued in counterpart Taiwanese Application No. 111138707 dated May 9, 2023.
Extended European Search Report issued in counterpart European Application No. 22881077.6 dated Aug. 28, 2025.
Korean Office Action dated Apr. 29, 2026 for Korean Application No. 10-2024-7015667.

* cited by examiner

SEAL MEMBER

This application is a 35 U.S.C. § 371 national phase application of PCT/JP2022/038174, filed on Oct. 13, 2022, which claims priority based on Japanese Patent Application No. 2021-167865 filed on Oct. 13, 2021, the contents of which are hereby incorporated herein by reference.

TECHNICAL FIELD

This invention relates to seal members.

This application claims priority based on Japanese Patent Application No. 2021-167865 filed on Oct. 13, 2021, the contents of which are hereby incorporated herein by reference.

BACKGROUND ART

The seal member is used, for example, as a jointing material to fill gaps that occur in plasterboard and fire doors that build the building frame and wall surfaces, such as columns and beams.

The seal member consists of a long substrate containing fibers, a pressure-sensitive adhesive layer formed by coating an adhesive over the entire one side of the substrate, and a release sheet provided over the pressure-sensitive adhesive layer. One end of the seal member has a peel-off notch that serves as a starting point for peeling off the release sheet. Then, just before using the seal member, peel off the release sheet from the peel-off cutout, and adhere the seal member to the object to be constructed.

Since seal members are usually intended to be used up after a single use, the peel-off starting part is often provided only at one end of the seal member. Therefore, even if the excess seal member is used for another occasion, it is difficult to peel off the release sheet because the excess seal member does not have a peel-off cutout. When the release sheet is forcibly removed, part of the substrate adheres to the release sheet via the pressure-sensitive adhesive layer, causing the substrate to peel off in layers (intralayer peeling).

Therefore, seal members are known to be constructed so that the substrate does not peel off in layers when the release sheet is peeled off.

For example, the above seal member is known as a seal member with a sheet fiber base, an undercoat layer for fiber sealant provided on the surface of the sheet fiber base, a pressure-sensitive adhesive layer formed in the form of dots on the undercoat layer, and a release sheet provided on the pressure-sensitive adhesive layer. In this seal member, the thickness of the pressure-sensitive adhesive layer is 100 μm to 200 μm (see, for example, Patent Document 1).

CITATION LIST

Patent Documents

[Patent Document 1]
Japanese Unexamined Patent Application, First Publication No. H11-269441

SUMMARY OF INVENTION

Technical Problem

Conventional seal members have the following problems (1) and (2) by reducing the amount of organic components, which are binders, in the substrate (sheet fiber substrate) to improve nonflammability.

(1) The substrate does not have sufficient intralaminar strength, and when the release sheet is peeled off from the pressure-sensitive adhesive layer, the pressure-sensitive adhesive layer is more likely to drop off and intralayer peeling occurs.

(2) If the adhesive strength of the pressure-sensitive adhesive layer to the release sheet is reduced to improve (1), the release sheet is easily peeled off from the pressure-sensitive adhesive layer, increasing the chance of the pressure-sensitive adhesive layer being contaminated by dust and other adhesions.

The present invention was made in view of the above circumstances, and it is an object to provide a seal member capable of suppressing dropout of the pressure-sensitive adhesive layer and intralayer peeling of the substrate that occurs when the release sheet is peeled off from the pressure-sensitive adhesive layer. It is also an object of this invention to provide a seal member that can inhibit peeling of the release sheet during transportation and storage.

Solution to Problem

The present invention has the following aspects

[1] A seal member formed in a strip shape having one side as a long side in plan view, comprising a substrate, a resin layer formed on one side of the substrate, and a release sheet provided on the resin layer, wherein the resin layer includes a pressure-sensitive adhesive layer, the pressure-sensitive adhesive layer has a plurality of pressure-sensitive adhesive section rows consisting of at least one pressure-sensitive adhesive sections extending in the length direction of the substrate, and the pressure-sensitive adhesive section rows are separated from each other in the width direction of the substrate.

[2] The seal member according to [1], wherein each pressure-sensitive adhesive section row independently comprises one continuous pressure-sensitive adhesive section elongating in the length direction of the substrate, or two or more pressure-sensitive adhesive sections aligned in the length direction of the substrate.

[3] The seal material according to [1] or [2], wherein in at least one pair of adjacent pressure-sensitive adhesive section rows, the pressure-sensitive adhesive section of one row at least partially overlaps the pressure-sensitive adhesive section of the adjacent other row in the width direction of the substrate.

[4] The seal member according to any one of [1] to [3], wherein the ratio (length/width) of the length of the pressure-sensitive adhesive section in the length direction to the width of the pressure-sensitive adhesive section in the width direction is 1.1 or more and 999 or less.

[5] The seal member according to any one of [1] to [4], wherein the entirety of one end of the pressure-sensitive adhesive section row in the length direction is separated from one end of the substrate in the length direction, and the length of separation between the end of the pressure-sensitive adhesive section row in the length direction closest to one end of the substrate in the length direction and the end of the substrate is 1 mm or more and 5 mm or less.

[6] The seal member according to any one of [1] to [5], wherein, when the length in the width direction of the pressure-sensitive adhesive section is $l_i$ at one end in the length direction of the pressure-sensitive adhesive section, and the length in the width direction of the pressure-sensitive adhesive section is $l_m$ at the center in the length direction of the pressure-sensitive adhesive section, the $l_i$ and $l_m$ satisfy the relationship of the following formula (1).

$$l_i \leq l_m \tag{1}$$

wherein i and m respectively indicate the position of one end and the position of the center in the length direction of the pressure-sensitive adhesive section.

[7] The seal member according to any one of [1] to [6], wherein the maximum peeling force to peel the release sheet from the resin layer by a tensile load perpendicular to the adhesive surface of the resin layer and the release sheet is 0.06 N/12.5 mm or more and 0.14 N/12.5 mm or less.

[8] The seal member according to any one of [1] to [7], wherein the Gurley stiffness of the release sheet in the length direction is 0.3 mN or more and 0.5 mN or less.

Advantageous Effects of Invention

According to the present invention, it is possible to provide a seal member that can suppress dropout of the pressure-sensitive adhesive layer that occurs when the release sheet is peeled off from the pressure-sensitive adhesive layer, as well as intralayer peeling of the substrate. The present invention can also provide seal member that can inhibit peeling of the release sheet during transportation and storage.

DESCRIPTION OF EMBODIMENTS

Figure 1:
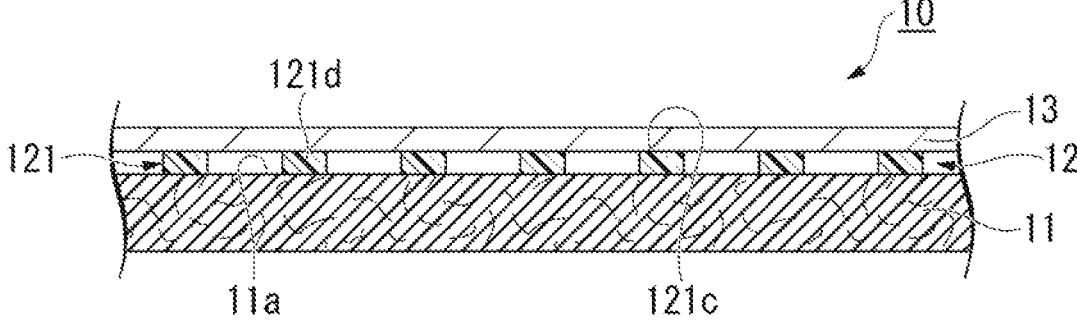
FIG. 1 schematically shows the seal member of one embodiment of the present invention and is a cross-sectional view along the length direction of the seal member.
Figure 2:
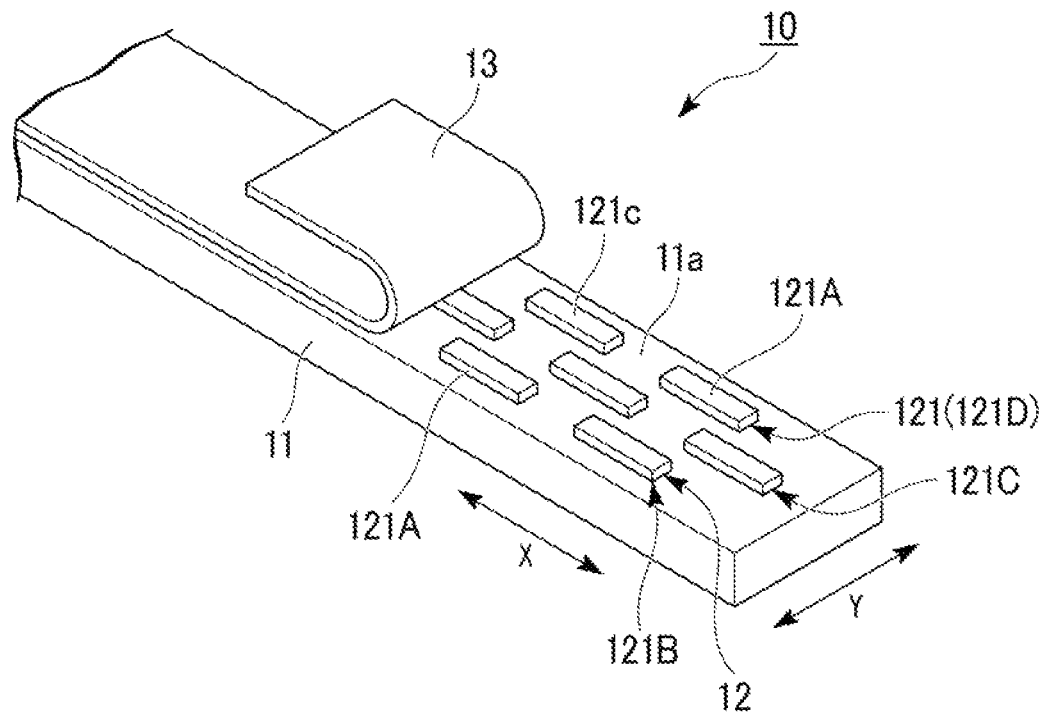
FIG. 2 is a schematic diagram of a seal member according to one embodiment of the invention.
Figure 3:
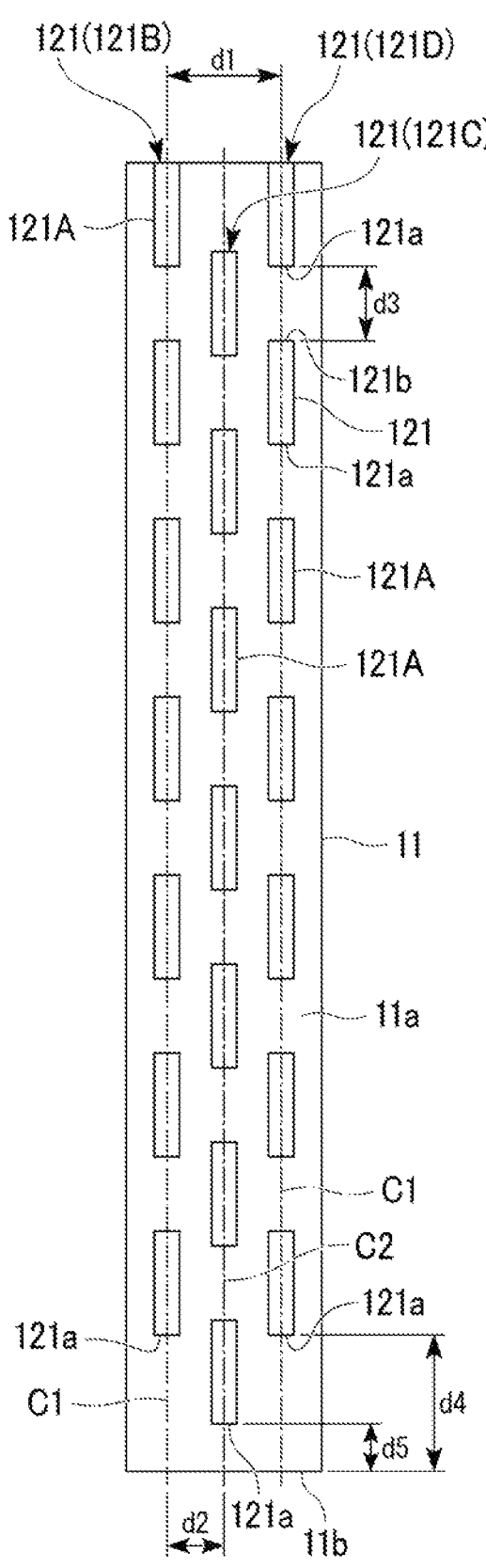
FIG. 3 is a plan view schematically showing the pressure-sensitive adhesive layer that constitutes the seal member of one embodiment of the present invention.

The following is a description of the seal member for one embodiment of the invention based on the drawings. FIG. 1 schematically shows the seal member of one embodiment of the invention and is a cross-sectional view along the length direction of the seal member. FIG. 2 is a schematic diagram of the seal member for one embodiment of the invention. FIG. 3 is a plan view schematically showing the pressure-sensitive adhesive layer that constitutes the seal member of one embodiment of the invention.

For convenience, each drawing used in the following explanation may show enlarged portions of the features for the purpose of making the features easier to understand. In addition, each drawing used in the following explanation may differ from the actual dimensional proportions of each component. The materials, dimensions, etc. exemplified in the following description are examples, and the present invention is not limited thereto. The present invention may be implemented with modifications as appropriate to the extent that the gist of the invention is not changed.

In this specification, the non-inflammability of the seal member with the release sheet removed from the seal member is referred to as "non-inflammability of the seal member.

[Seal Member]

As shown in FIGS. 1 and 2, the seal member 10 in this embodiment has a substrate 11, a resin layer 12 provided on one side 11a of the substrate 11, and a release sheet 13 provided on the resin layer 12. The seal member 10 is strip-shaped in plan view, with one side being long. In FIG. 2, the x-direction is the long side (length) of the seal member 10 and the y-direction is the short side (width) of the seal member 10. The length of the substrate 11, resin layer 12, and release sheet 13 is the same direction as the length of the seal member 10. The short lengths of the substrate 11, resin layer 12, and release sheet 13 are in the same direction as the short length of the seal member 10.

As shown in FIGS. 1 and 2, the resin layer 12 includes a pressure-sensitive adhesive layer 121. The pressure-sensitive adhesive layer 121 has a plurality of pressure-sensitive adhesive section rows consisting of two or more pressure-sensitive adhesive sections 121A, each independently aligned in the length direction of the substrate 11. The case in which the pressure-sensitive adhesive layer 121 has a first pressure-sensitive adhesive section row 121B, a second pressure-sensitive adhesive section row 121C, and a third pressure-sensitive adhesive section row 121D, each comprising a pressure-sensitive adhesive section 121A, is illustrated here. The first pressure-sensitive adhesive section row 121B, second pressure-sensitive adhesive section row 121C, and third pressure-sensitive adhesive section row 121D are spaced apart from each other in the width direction of the substrate 11. The pressure-sensitive adhesive layer 121 consists of a plurality of pressure-sensitive adhesive sections 121A provided on one side 11a of the substrate 11 and spaced apart from each other. In other words, the pressure-sensitive adhesive layer 121 is a set of multiple pressure-sensitive adhesive sections 121A provided on one side 11a of the substrate 11. Pressure-sensitive adhesive section 121A comprises first pressure-sensitive adhesive section row 121B, second pressure-sensitive adhesive section row 121C, and third pressure-sensitive adhesive section row 121D. The pressure-sensitive adhesive section 121A is discontinuous in the length direction of the substrate 11 in plan view. In this embodiment, "discontinuous" means that the pressure-sensitive adhesive section 121A has an island-like structure, and there are areas where the substrate 11 is exposed on one side 11a of the substrate 11.

[Substrate]

The substrate 11 is the main body of the seal member 10, with a resin layer 12 on one side 11a.

The substrate 11 contains inorganic and organic components.

Inorganic components include inorganic fibers and inorganic binders.

The inorganic fiber is the component that gives the seal member 10 its noncombustibility.

Inorganic fibers include, for example, amorphous fibers such as bio-soluble ceramic fibers, glass fibers, glass wool, and rock wool fibers; polycrystalline fibers such as carbon fibers, activated carbon fibers, and alumina fibers; and mineral materials such as sepiolite. Among these, amorphous fibers are preferred from a cost perspective. Among them, rockwool fibers are more preferred from the viewpoint of increasing the noncombustibility of the seal member 10.

One of these inorganic fibers may be used alone or in combination of two or more.

The average fiber diameter of inorganic fibers is preferably 3 µm or more and 20 µm or less, and 3 µm or more and 7 µm or less is more preferable. If the average fiber diameter of the inorganic fibers is above the lower limit above, the strength (shape retention) of the substrate 11 is improved. If the average fiber diameter of the inorganic fibers is below the above upper limit, the uniformity of strength of the substrate 11 is improved.

The average fiber diameter of inorganic fibers is the additive average of area diameters derived by calculating the cross-sectional area perpendicular to the length direction of the inorganic fibers using a known calculation method based on vertical cross sections at any 20 locations on the substrate 11 imaged under a microscope, and calculating the diameter of a perfect circle having the same area as the cross-sectional area.

The average fiber length of inorganic fibers is preferably 3 mm or more and 35 mm or less, and 5 mm or more and 25 mm or less is more preferable. If the average fiber length of the inorganic fibers is above the lower limit above, the strength of the substrate 11 is improved. If the average fiber length of the inorganic fibers is below the above upper limit, the uniformity of strength of the substrate 11 is improved.

The average fiber length of inorganic fibers is the additive average of the measured longitudinal lengths of 20 randomly selected inorganic fibers under a microscope.

Examples of inorganic binders include colloidal silica, fumed silica, alumina sol, zirconia sol, and titania sol. Among these, colloidal silica is preferred from the viewpoint of binder reinforcement of inorganic fibers.

One of these inorganic binders may be used alone or in combination with two or more.

Inorganic binders can be spherical powders, irregular powders, emulsions, sols, or gels.

When the inorganic binder is a spherical or irregularly shaped powder, the average particle size of the inorganic binder is preferably 7 µm or more and 20 µm or less, and 9 µm or more and 15 µm or less is more preferable. If the average particle size of the inorganic binder is above the lower limit above, the strength of the substrate 11 is improved. If the average particle size of the inorganic binder is below the above upper limit, the uniformity of strength of the substrate 11 is improved.

The average particle size of the inorganic binder is determined by the BET method. Specifically, the average particle diameter of the inorganic binder is determined from the specific surface area of the inorganic binder determined by the BET method and the density of the inorganic binder, based on Formula (1) below.

$$\text{Average particle size of inorganic binder } [\mu m] = 6/ \\ (\text{BET specific surface area } [m^2/g] \times \text{density} \\ [g/cm^3]) \tag{1}$$

When the mass of the substrate 11 is 100 parts by mass, the mass of the inorganic component (C) in the substrate 11 is preferably 90 parts by mass or more and 94 parts by mass or less. If the mass (C) is above the lower limit above, the noncombustibility of the seal member 10 is further improved. If the mass (C) is less than or equal to the above upper limit, peeling within the layer of the substrate 11 can be more suppressed when the release sheet 13 is peeled off from the seal member 10.

In particular, the mass of the inorganic fiber (C-1) is preferably 91 parts by mass or more and 93 parts by mass or less when the mass of the substrate 11 is 100 parts by mass. The basis weight (c) of the inorganic component in the substrate 11 is preferably 1800 g/m² or more and 1880 g/m² or less, and 1820 g/m² or more and 1860 g/m² or less is more preferred. If the basis weight (c) is above the lower limit above, the noncombustibility of the seal member 10 is improved. If the basis weight (c) is less than the above upper limit, peeling within the layer of the substrate 11 can be more suppressed when the release sheet 13 is peeled off from the seal member 10.

Organic components include organic binders, organic fibers, paper strength enhancers, and polymer coagulants.

Examples of organic binders include acrylic resin, starch, PVA (polyvinyl alcohol), and polyacrylamide. Among these, acrylic resins are preferred from the viewpoint of manufacturing stability and in-layer strength retention.

One of these organic binders may be used alone or in combination with two or more.

The organic binder may be an emulsion.

Acrylic resins are monopolymer or copolymer of acrylic monomers such as acrylic acid and its esters, methacrylic acid and its esters, acrylamide, acrylonitrile, etc.; furthermore, copolymers of the aforementioned acrylic monomers and at least one of vinyl monomers such as vinyl acetate, maleic anhydride, styrene, etc.

Organic fibers include synthetic fibers such as polyethylene terephthalate (PET) fibers, polyolefin fibers (e.g., polyethylene (PE) fibers, polypropylene (PP) fibers, etc.), acrylic fibers; wood pulp, natural fibers other than wood pulp (e.g., cotton, straw, bamboo, esparto, bagasse, linter, Manila hemp, flax, hemp, yellow hemp, ganoderma, etc.), semi-synthetic fibers (e.g., acetate fibers, viscose rayon, etc.), wool, and wool.

One of these organic fibers may be used alone or in combination of two or more.

Examples of paper strength enhancers include melamine resins, urea resins, polyamide epichlorohydrin resins, epoxy resins, dialdehyde starch, polyacrylamide, and polyethyleneimine.

One of these paper strength enhancers may be used alone or in combination with two or more.

Polyacrylamide, polymethacrylate, polyvinylamine, polyacrylic acid, styrene resin, and polyethylene oxide are examples of polymer flocculants.

One of these polymer coagulants may be used alone or in combination with two or more.

When the mass of the substrate 11 is 100 parts by mass, the mass of the organic component (B) in the substrate 11 is preferably 6 parts by mass or more and 10 parts by mass or less. If the mass (B) is above the lower limit mentioned above, peeling within the layer of the substrate 11 can be more suppressed when the release sheet 13 is peeled off from the seal member 10. If the mass (B) is less than or equal to the aforementioned upper limit, the nonflammability of the seal member 10 is further improved.

The basis weight (b) of the organic component in the substrate 11 is preferably 120 g/m² or more and 200 g/m² or less, and 130 g/m² or more and 160 g/m² or less is more preferred. If the basis weight (b) is above the lower limit mentioned above, peeling within the layer of the substrate 11 can be more suppressed when the release sheet 13 is peeled off from the seal member 10. If the basis weight (b) is less than or equal to the upper limit mentioned above, the noncombustibility of the seal member 10 is further improved.

The shape of the substrate 11 is not particularly limited, but a sheet shape is preferred, and a long sheet shape in the X direction shown in FIG. 2 is more preferred.

The width of the substrate 11 (i.e., the length in the direction perpendicular to the Y direction relative to the length direction (X direction) of the substrate 11) is not particularly limited, but is preferably 5 mm or more and 100 mm or less, and 10 mm or more and 50 mm or less is more preferred.

The length of the substrate 11 (i.e., the length of the substrate 11 in the length direction (X direction)) is not particularly limited, but if the seal member 10 is intended to be used up in one time, it is preferably 150 cm or less, and 75 cm or more and 100 cm or less is more preferred. Even if the seal member 10 of this form is not used up at one time and there is a surplus, the remainder can be used on another occasion, as described in detail below, so the length of the substrate 11 may be over 150 cm, in which case the upper limit for the length of the substrate 11 is about 10 m. In other words, the length of the substrate 11 may be greater than 150 cm and 10 m or less.

The thickness of the substrate 11 is not particularly limited, but is preferably 4 mm or more and 20 mm or less, and 4 mm or more and 15 mm or less is more preferred. The basis weight (d) of the substrate 11, i.e., the sum of the basis weight (b) and the basis weight (c), is preferably 1920 g/m² or more and 2080 g/m² or less, and 1950 g/m² and more and 2020 g/m² or less is more preferred.

[Resin Layer]

As shown in FIGS. 2 and 3, the pressure-sensitive adhesive section 121A is rectangular in plan view, extending in the length direction of the substrate 11. The pressure-sensitive adhesive sections 121A are arranged discontinuously along the length direction of the substrate 11 in plan view. The first pressure-sensitive adhesive section row 121B, second pressure-sensitive adhesive section row 121C, and third pressure-sensitive adhesive section row 121D are arranged discontinuously in the width direction of the substrate 11 in plan view. Furthermore, on one side 11a of the substrate 11, in plan view, along the length direction of the substrate 11, an area in which two pressure-sensitive adhesive sections 121A are arranged in parallel in the width direction (first area) and an area in which one pressure-sensitive adhesive section 121A is arranged in the width direction (second area) are formed alternately. The pressure-sensitive adhesive section 121A in the second region is located on the center line C2 passing through the middle of the two pressure-sensitive adhesive sections 121A in the first region along the length direction of the substrate 11.

In the first region, the distance in the width direction of the substrate 11 between two adjacent pressure-sensitive adhesive sections 121A (d1 shown in FIG. 3) is adjusted so that the ratio of the total area of the pressure-sensitive adhesive layer 121 in plan view (the presence of the pressure-sensitive adhesive layer 121) to the total area of one side 11a of the substrate 11 is 20% or more and 35% or less. In the first area, the distance in the width direction of the substrate

11 between two adjacent pressure-sensitive adhesive sections 121A (d1 shown in FIG. 3) is adjusted so that the ratio (length/width) of the length (length) of the pressure-sensitive adhesive section 121A in the length direction to the length (width) in the width direction of the pressure-sensitive adhesive section 121A is 1.1 or more and 999 or less.

The aforementioned d1 is the length between the center lines C1 along the length direction of two adjacent pressure-sensitive adhesive sections 121A in the first region.

The distance in the width direction of the substrate 11 between the pressure-sensitive adhesive section 121A in the first region and the pressure-sensitive adhesive section 121A in the second region adjacent to the first region (d2 shown in FIG. 3) is such that the ratio of the total area of the pressure-sensitive adhesive layer 121 in plan view (the presence of the pressure-sensitive adhesive layer 121) to the total area of one side 11a of the substrate 11 is 20% or more and 35% or less. The distance in the width direction of the substrate 11 between the pressure-sensitive adhesive section 121A in the first area and the pressure-sensitive adhesive section 121A in the second area adjacent to the first area (d2 shown in FIG. 3) is adjusted so that the ratio of the length (length/width) of the pressure-sensitive adhesive section 121A in the length direction (length) to the length (width) in the width direction (length) is between 1.1 and 999 (between A and B means A or more and B or less in this specification).

The aforementioned d2 is the length between the center line C1 along the lengthwise direction of the pressure-sensitive adhesive section 121A in the first region and the center line C2 along the lengthwise direction of the pressure-sensitive adhesive section 121A in the second region adjacent to the first region.

In the length direction of the substrate 11, the distance between two adjacent pressure-sensitive adhesive sections 121A (d3 shown in FIG. 3) is adjusted so that the ratio of the total area of the pressure-sensitive adhesive layer 121 in plan view (the presence of the pressure-sensitive adhesive layer 121) to the total area of one side 11a of the substrate 11 is between 20% and 35%. In the length direction of the substrate 11, the distance between two adjacent pressure-sensitive adhesive sections 121A (d3 shown in FIG. 3) is adjusted so that the ratio of the length (length/width) of the pressure-sensitive adhesive section 121A to the length (width) of the pressure-sensitive adhesive section 121A in the width direction (length) is between 1.1 and 999.

The aforementioned d3 is the length between one end 121a and the other end 121b of the two adjacent pressure-sensitive adhesive sections 121A in the length direction of the substrate 11.

In at least one pair of mutually adjacent adhesive rows, the pressure-sensitive adhesive section of one row preferably overlaps at least partially with the pressure-sensitive adhesive section of the adjacent other row in the width direction of the substrate 11. In this embodiment, for example, the pressure-sensitive adhesive section 121A of the first pressure-sensitive adhesive section row 121B preferably overlaps at least partially with the pressure-sensitive adhesive section 121A of the adjacent second pressure-sensitive adhesive section row 121C in the width direction of the substrate 11. This reduces uneven adhesion of the release sheet 13 to the pressure-sensitive adhesive layer 121 and reduces partial loss of adhesive strength.

The ratio of the length (length/width) of the pressure-sensitive adhesive section 121A in the length direction (length) to the length (width) in the width direction (width) of the pressure-sensitive adhesive section 121A is preferably between 1.1 and 999, more preferably between 4 and 666.7, and more preferably between 10 and 500. If the ratio (length/width) is above the lower limit mentioned above, peeling of the pressure-sensitive adhesive section 121A, which tends to occur when peeling off the release sheet 13, is improved. If the ratio (length/width) is less than or equal to the upper limit described above, it is easier to apply the pressure-sensitive adhesive section 121A onto the substrate 11, and uneven adhesion is less likely to result in a partial decrease in adhesive strength.

As shown in FIG. 3, the entirety of one end 121a of the first, second, and third pressure-sensitive adhesive section rows 121B, 121C, and 121D in the length direction is separated from one end 11b of the substrate 11. The length of separation between one end 121a of the second pressure-sensitive adhesive section row 121C closest to one end 11b in the length direction of the substrate 11 and one end 11b in the length direction of the substrate 11 is preferably 1 mm or more and 5 mm or less, and between 2 mm and 4 mm is more preferred. In FIG. 3, the length of separation between one end 121a of the first and third pressure-sensitive adhesive section rows 121B and 121D and one end 11b of the substrate 11 in the length direction is d4, the length of separation between one end 121a of the second pressure-sensitive adhesive section row 121C and one end 11b of the substrate 11 in the length direction is d5. The d5 is preferably 1 mm or more and 5 mm or less, and between 2 mm and 4 mm is more preferable. In addition, d4 and d5 satisfy the relationship d5<d4. If d5 is above the lower limit, the pressure-sensitive adhesive section 121A is no longer present at one end of the seal member 10, so when peeling the release sheet 13 from the pressure-sensitive adhesive layer 121, a large peeling force is not generated and the probability of intralayer peeling of the substrate 11 is reduced. If the d5 is less than or equal to the upper limit, floating of the seal member 10 due to non-contact between the end of the seal member 10 and the object to be sealed (hereinafter referred to as "object") is less likely to occur when the seal member 10 is bonded to the object.

The pressure-sensitive adhesive layer 121 is formed by coating one side 11a of the substrate 11 with adhesive and drying.

As an adhesive, known adhesives used for seal members can be used, with no particular restrictions, such as acrylic adhesives, urethane adhesives, acrylonitrile butadiene copolymer adhesives, rubber-based adhesives, silicone-based adhesives, polyester-based adhesives, polyamide-based adhesives, epoxy-based adhesives vinyl alkyl ether-based adhesives, fluorinated adhesives, etc. Among these, acrylic adhesives are preferred from the viewpoint of enhanced adhesion to the object. Acrylic adhesives contain acrylic resin. In other words, the pressure-sensitive adhesive section 121 preferably contain acrylic resin. Acrylic resins include the acrylic resins illustrated earlier in the description of the substrate 11.

One of these adhesives may be used alone or in combination of two or more.

The pressure-sensitive adhesive layer 121 is mainly composed of organic components derived from adhesive (e.g., acrylic resin, etc.), but may also contain inorganic components to the extent that the effects of the invention are not impaired. Inorganic components include inorganic additives contained in adhesives.

The ratio of the total area of the pressure-sensitive adhesive layer 121 in plan view (the presence of the pressure-sensitive adhesive layer 121) to the total area of one side 11a of the substrate 11 is preferably between 20% and 35%, and between 25% and 30% is more preferred. If the presence rate of the pressure-sensitive adhesive layer 121 is above the lower limit above, the adhesion to the object can be well maintained. If the percentage of pressure-sensitive adhesive layer 121 present is below the above upper limit, the nonflammability is further improved. In addition, the release sheet 13 is more easily peeled off from the seal member 10.

The presence of the pressure-sensitive adhesive layer 121 is generally the same as the aperture ratio of the coating plate used to provide the pressure-sensitive adhesive layer 121 on one side 11a of the substrate 11, as described below in detail.

The thickness of the pressure-sensitive adhesive layer 121 is not particularly limited, but it is preferred to be 100 μm or more and 300 μm or less, and 150 μm or more and 250 μm or less is further preferred.

A layer of non-adhesive resin may be formed between the pressure-sensitive adhesive layers 121.

When the mass of the substrate 11 is 100 parts by mass, the mass of the organic component (A) in the resin layer 12 is preferably 0.5 parts by mass or more and 6 parts by mass or less, between 1.5 and 4 parts by mass, and between 1.5 and 2 parts by mass. If the mass (A) is above the lower limit mentioned above, adhesion to the object can be maintained. If the mass (A) is less than or equal to the aforementioned upper limit, the noncombustibility of the seal member 10 is improved. In addition, it is easier to peel off the release sheet 13 from the seal member 10.

The sum (A+B) of the mass (A) and the mass (B) of the organic component contained in the substrate 11 is preferably between 6.5 and 12 parts by mass, more preferably between 7 and 12 parts by mass, and even more preferably between 7.5 and 12 parts by mass. If the sum of mass (A) and mass (B) (A+B) is greater than the aforementioned lower limit, peeling within the layer of the substrate 11 can be suppressed when the release sheet 13 is peeled off from the seal member 10. If the sum of mass (A) and mass (B) (A+B) is less than or equal to the above upper limit, the nonflammability of the seal member 10 is improved.

The basis weight (a) of the organic component in the resin layer 12 is preferably between 10 g/m$^2$ and 120 g/m$^2$, and between 30 g/m$^2$ and 80 g/m$^2$ and between 30 g/m$^2$ and 40 g/m$^2$, or less is even more preferred. If the basis weight (a) is above the lower limit mentioned above, adhesion to the object can be maintained. If the basis weight (a) is less than or equal to the aforementioned upper limit, the noncombustibility of the seal member 10 is improved. In addition, it is easier to peel off the release sheet 13 from the seal member 10.

In this embodiment, the basis weight (a) of the organic component in the resin layer 12 and the basis weight (al) of the organic component in the pressure-sensitive adhesive layer 121 are the same. The basis weight (al) roughly corresponds to the amount of adhesive coating described below.

In FIGS. 2 and 3, the case is illustrated in which, in plan view, along the length direction of the substrate 11, an area in which two pressure-sensitive adhesive sections 121A are arranged in parallel in the width direction (first area) and an area in which one pressure-sensitive adhesive section 121A is arranged in the width direction (second area) are alternately formed, but this embodiment is not limited thereto. However, this embodiment is not limited to this. In this embodiment, in plan view, three pressure-sensitive adhesive sections 121A may be arranged in parallel in the width direction along the length direction of the substrate 11.

[Release Sheet]

The release sheet 13 is provided on the resin layer 12, i.e., on the side 121c opposite the substrate 11 of the pressure-sensitive adhesive layer 121.

As the release sheet 13, any known release sheet can be used. The release sheet 13 includes, for example, polyester film, polyethylene film, polypropylene film, polyimide film, release paper, polyetheretherketone (PEEK), polyethylene naphthalate (PEN), liquid crystal polyarylate, polyamideimide (PAI), Polyethersulfone (PES), etc., and films with mold release treatment, etc. applied to them.

The thickness of the release sheet 13 is not particularly limited, but it is preferred to be 50 μm or more and 150 μm or less, and 60 μm or more and 120 μm or less is more preferable.

The maximum peeling force to peel the release sheet 13 from the resin layer 12 by a tensile load perpendicular to the adhesive surface of the resin layer 12 and the release sheet 13 (the surface 121a opposite the substrate 11 of the pressure-sensitive adhesive layer 121) is preferably between 0.06 N/12.5 mm and 0.14 N/12.5 mm. 0.06 N/12.5 mm and more and 0.10 N/12.5 mm or less is more preferable. If the maximum peeling force is above the lower limit mentioned above, peeling of the release sheet 13 during storage is suppressed. If the maximum peeling force is less than the aforementioned upper limit, the pressure-sensitive adhesive layer 121 will be difficult to peel off when peeling off the release sheet 13.

The maximum peeling force of the release sheet 13 can be measured using a tensile tester as follows The seal member 10 is 12.5 mm wide.

The release sheet 13 is pulled in a direction perpendicular to one side 11a of the substrate 11 (upward to one side 11a of the substrate 11), and the maximum stress is measured when the release sheet 13 is removed from the substrate 11.

The distance between the chuck of the tensile tester and the substrate 11 is set to 10 mm. One end of the release sheet 13 is clamped between the chuck of the tensile tester and the release sheet 13 is pulled by the chuck with the chuck moving at 200 mm/min. In doing so, the substrate 11 is moved at a speed of 200 mm/min so that the release sheet 13 is always perpendicular to one side 11a of the substrate 11, and the substrate 11 is not lifted off the base of the tensile testing machine.

The release sheet 13 is pulled 30 mm in total, and the maximum value in the measured stress is the maximum peel force of the release sheet 13.

The Gurley stiffness of the release sheet 13 in the length direction is preferably between 0.3 mN and 0.5 mN, and between 0.3 mN and 0.4 mN is more preferable. If the Gurley rigidity is above the lower limit mentioned above, the paper is stiff and easy to work with when bonding the release sheet 13 onto the pressure-sensitive adhesive layer 121 after forming the pressure-sensitive adhesive layer 121. If the Gurley rigidity is less than or equal to the aforementioned upper limit, the peeling of the release sheet 13 can be prevented because it easily follows vibration and twisting during transportation and storage, and the decrease in adhesive strength due to adhesion of paper dust to the pressure-sensitive adhesive layer 121 is suppressed.

The Gurley stiffness of the release sheet 13 in the length direction can be measured by the method according to JAPAN TAPPI No. 40:2000.

[Manufacturing Method]

The manufacturing method of the seal member 10 of this embodiment, for example, includes the process of discontinuously coating and drying an adhesive on one side 11a of the substrate 11 to form a pressure-sensitive adhesive layer 121 (pressure-sensitive adhesive layer forming process), and the process of laminating a release sheet 13 on the pressure-sensitive adhesive layer 121 (that is, the side 121a opposite to the substrate 11 of the pressure-sensitive adhesive layer 121) (lamination (laminating process).

In the pressure-sensitive adhesive layer formation process, the adhesive is preferably applied to one side 11a of the substrate 11 using a coating plate with a plurality of through holes formed at predetermined intervals. By drying the adhesive coated on one side 11a of the substrate 11 using this coating plate, the pressure-sensitive adhesive layer 121 described above is formed.

The shape and diameter of the through hole preferably be set so that the pressure-sensitive adhesive section 121A has the desired shape and size.

The thickness of the coated plate, i.e., the depth of the through-hole, preferably be set so that the pressure-sensitive adhesive layer 121 has the desired thickness and coating amount.

The shape of the coating plate is not restricted and can be in sheet or roll form. From the standpoint of continuous production of 10 seal members, rolls are preferred.

The aperture ratio of the coating plate with multiple through holes is preferably 20% or more and 35% or less. If the aperture ratio of the coated plate is above the lower limit mentioned above, good adhesion to the object can be maintained. If the aperture ratio of the coated plate is less than or equal to the aforementioned upper limit, the nonflammability is further improved. In addition, it is easier to peel off the release sheet 13 from the seal member 10.

The aperture ratio of the coated plate is the ratio of the total area of through holes to the total area of the surface of the coated plate with through holes.

The coating amount of adhesive is preferably 10 g/m$^2$ or more and 120 g/m$^2$ or less, and between 15 g/m$^2$ and 80 g/m$^2$ is more preferable, and 20 g/m$^2$ or more and 40 g/m$^2$ or less is even preferred.

The drying temperature after coating is preferably between 100° C. and 130° C., and between 115° C. and 125° C. is more preferable.

The drying time after coating is preferably between 5 and 15 minutes, and between 7 and 12 minutes is more preferable.

The seal member 10 may be produced by discontinuously coating one side of the release sheet 13 with an adhesive and drying it to form a pressure-sensitive adhesive layer 121, and then laminating the release sheet 13 with the pressure-sensitive adhesive layer 121 and the substrate 11 so that the exposed surface of the pressure-sensitive adhesive layer 121 contacts one side 11a of the substrate 11.

The seal member 10 of this embodiment is strip-shaped in plan view, with one side as the longitudinal side, and has a substrate 11, a resin layer 12 provided on one side 11a of the substrate 11, and a release sheet 13 provided on the resin layer 12. In this embodiment of the seal member 10, the resin layer 12 includes a pressure-sensitive adhesive layer 121, and the pressure-sensitive adhesive layer 121 has a first pressure-sensitive adhesive section row 121B, a second pressure-sensitive adhesive section row 121C, and a third pressure-sensitive adhesive section row 121D, each comprising two or more pressure-sensitive adhesive sections 121A that independently extend in the length direction of the substrate 11, and the first pressure-sensitive adhesive section row 121B, second pressure-sensitive adhesive section row 121C and the third pressure-sensitive adhesive section row 121D are aligned in the width direction of the substrate 11.

Therefore, according to the seal member 10 of this embodiment, the peeling of the pressure-sensitive adhesive layer 121 and the delamination within the layer of the substrate 11 that occurs when the release sheet 13 is peeled off can be suppressed. The seal member 10 of this embodiment also prevents the peeling of the release sheet 13 during transportation and storage.

If the ratio (length/width) of the length (length) of the pressure-sensitive adhesive section 121A in the length direction (length) to the length (width) of the pressure-sensitive adhesive section 121A in the width direction (width) is between 1.1 and 999, the peeling force acting on the pressure-sensitive adhesive layer 121 at the moment the peeling sheet 13 begins to peel off in the length direction can be reduced, and the frequency of occurrence of peeling within the layer by the pressure-sensitive adhesive layer 121 The frequency of occurrence of peeling within the layer of the substrate 11 by the pressure-sensitive adhesive layer 121 is reduced. As a result, peeling of the pressure-sensitive adhesive layer 121 when peeling off the release sheet 13 can be suppressed.

If the entirety of one end of the first pressure-sensitive adhesive section row 121B, the second pressure-sensitive adhesive section row 121C or the third pressure-sensitive adhesive section row 121D in the length direction is separated from one end 11$b$ of the substrate 11 in the length direction. If the length of the separation is between 1 mm and 5 mm, the pressure-sensitive adhesive layer 121 is not present at the position opposite one end of the release sheet 13 that is bent by cutting. Therefore, the peeling force acting on the substrate 11 does not occur at one end of the pressure-sensitive adhesive layer 121 in the length direction. As a result, intralayer peeling of the substrate 11 by the pressure-sensitive adhesive layer 121 can be suppressed. One end of the release sheet 13 in the length direction is bent by cutting. Therefore, at one end of the length direction of the release sheet 13, the contact area between the release sheet 13 and the pressure-sensitive adhesive layer 121 becomes larger. As a result, a greater peeling force may occur on the pressure-sensitive adhesive layer 121 compared to other areas.

If the maximum peeling force of the above release sheet 13 is between 0.06 N/12.5 mm and 0.14 N/12.5 mm, the peeling force acting on the pressure-sensitive adhesive layer 121 can be reduced at the moment when the release sheet 13 starts to peel off in the length direction. As a result, peeling of the pressure-sensitive adhesive layer 121 when peeling off the release sheet 13 can be suppressed.

If the Gurley rigidity in the length direction of the above release sheet 13 is between 0.3 mN and 0.5 mN, the release sheet 13 will easily follow the movement of the substrate 11 even if vibration or the like is applied to the substrate 11 during transportation or storage. As a result, the release sheet 13 is difficult to peel off.

The seal member 10 in this form may be stored, for example, in a spiral shape with one end as the starting point, or it may be wound around a bobbin or the like.

The seal member 10 of this form is suitable, for example, as a jointing material to be filled in the gap between fire doors or in the joints that occur at the joints between the building frame, such as columns and beams of a building, and the plasterboard that builds the wall surface.

OTHER EMBODIMENTS

The invention is not limited to the above embodiments.

For example, the variants shown in FIG. 4 to FIG. 8 may be adopted. In the variations, the same symbols are attached to the same parts as the components in the above embodiments and their description is omitted, and only the different points are explained.

First Variant

Figure 4:
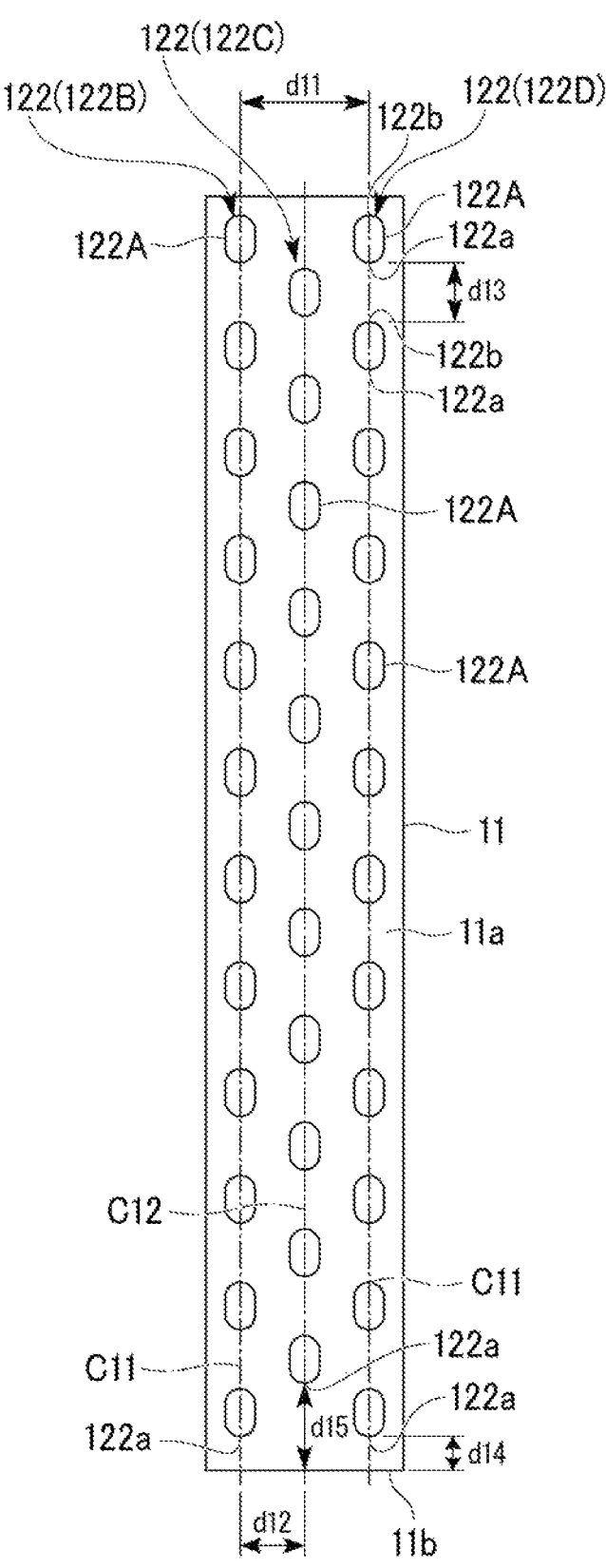
FIG. 4 is a schematic plan view of a variant of the pressure-sensitive adhesive layer that constitutes the seal member of one embodiment of the present invention.

In the first variant shown in FIG. 4, the resin layer 12 includes a pressure-sensitive adhesive layer 122. The pressure-sensitive adhesive layer 122 has a plurality of pressure-sensitive adhesive section rows consisting of two or more pressure-sensitive adhesive sections 122A, each independently aligned in the length direction of the substrate 11. Here is an example where the pressure-sensitive adhesive layer 122 has a first pressure-sensitive adhesive section row 122B, a second pressure-sensitive adhesive section row 122C, and a third pressure-sensitive adhesive section row 122D, each comprising a pressure-sensitive adhesive section 122A. The first pressure-sensitive adhesive section row 122B, the second pressure-sensitive adhesive section row 122C, and the third pressure-sensitive adhesive section row 122D are spaced apart from each other in the width direction of the substrate 11. The pressure-sensitive adhesive layer 122 consists of a plurality of pressure-sensitive adhesive sections 122A provided on one side 11$a$ of the substrate 11 and spaced apart from each other. In other words, the pressure-sensitive adhesive layer 122 is a set of multiple pressure-sensitive adhesive sections 122A provided on one side 11$a$ of the substrate 11. Pressure-sensitive adhesive section 122A comprises first pressure-sensitive adhesive section row 122B, second pressure-sensitive adhesive section row 122C, and third pressure-sensitive adhesive section row 122D. The pressure-sensitive adhesive section 122A is discontinuous in the length direction of the substrate 11 in plan view.

The pressure-sensitive adhesive section 122A is, in plan view, an ellipse (oval) shape extending in the length direction of the substrate 11, with both ends convex in the length direction. The pressure-sensitive adhesive sections 122A are arranged discontinuously along the length direction of the substrate 11 in plan view. The first pressure-sensitive adhesive section row 122B, the second pressure-sensitive adhesive section row 122C, and the third pressure-sensitive adhesive section row 122D are arranged discontinuously in the width direction of the substrate 11 in plan view. Furthermore, on one side 11$a$ of the substrate 11, in plan view, along the length direction of the substrate 11, a region in which two pressure-sensitive adhesive sections 122A are arranged in parallel in the width direction (first region) and a region in which one pressure-sensitive adhesive section 122A is arranged in the width direction (second region) are alternately formed. The pressure-sensitive adhesive section 122A in the second region is located on the center line C12 passing through the middle of the two pressure-sensitive adhesive sections 122A in the first region along the length direction of the substrate 11.

In the first region, the distance in the width direction of the substrate 11 between the two adjacent pressure-sensitive adhesive sections 122A (d11 shown in FIG. 4) is adjusted so that the ratio of the total area of the pressure-sensitive adhesive layer 122 in plan view (the presence of the pressure-sensitive adhesive layer 122) to the total area of one side 11$a$ of the substrate 11 is between 20% and 35%. In the first region, the distance in the width direction of the substrate 11 between two adjacent pressure-sensitive adhesive sections 122A (d11 shown in FIG. 4) is adjusted so that the ratio of the length (length/width) of the pressure-sensitive adhesive section 122A in the length direction of its length (length) to its width (width) is between 1.1 and 999.

The aforementioned d11 is the length between the center lines C11 along the length direction of the two adjacent pressure-sensitive adhesive sections 122A in the first region.

The spacing in the width direction of the substrate 11 between the pressure-sensitive adhesive section 122A in the first region and the pressure-sensitive adhesive section 122A in the second region adjacent to the first region (d12 shown in FIG. 4) is adjusted such that the ratio of the total area of the pressure-sensitive adhesive layer 122 in plan view (the presence of the pressure-sensitive adhesive layer 122) to the total area of one side 11a of the substrate 11 is between 20% and 35. The distance in the width direction of the substrate 11 between the pressure-sensitive adhesive section 122A in the first region and the pressure-sensitive adhesive section 122A in the second region adjacent to the first region (d12 shown in FIG. 4) is adjusted so that the ratio of the length (length/width) of the pressure-sensitive adhesive section 122A in the length direction (length) to the length (width) of the pressure-sensitive adhesive section 122A in the width direction (length) is between 1.1 and 999 The ratio of the length (length/width) of the pressure-sensitive adhesive section 122A to the length (width) of the pressure-sensitive adhesive section 122A in the length direction is between 1.1 and 999.

The aforementioned d12 is the length between the center line C11 along the length direction of the pressure-sensitive adhesive section 122A in the first region and the center line C12 along the length direction of the pressure-sensitive adhesive section 122A in the second region adjacent to the first region.

In the length direction of the substrate 11, the distance between two adjacent pressure-sensitive adhesive sections 122A (d13 shown in FIG. 4) is adjusted so that the ratio of the total area of the pressure-sensitive adhesive layer 122 in plan view (the percentage of the pressure-sensitive adhesive layer 122 present) to the total area of one side 11a of the substrate 11 is between 20% and 35%. In the length direction of the substrate 11, the distance between two adjacent pressure-sensitive adhesive sections 122A (d13 shown in FIG. 4) is adjusted so that the ratio of the length (length/width) of the pressure-sensitive adhesive section 122A in the length direction (length) to the length (width) in the width direction (width) is between 1.1 and 999.

The aforementioned d13 is the length between one end 122a and the other end 122b of the two adjacent pressure-sensitive adhesive sections 122A in the length direction of the substrate 11.

In this embodiment, for example, the pressure-sensitive adhesive section 122A of the first pressure-sensitive adhesive section row 122B does not overlap with the pressure-sensitive adhesive section 122A of the adjacent second pressure-sensitive adhesive section row 122C in the width direction of the substrate 11.

The ratio of the length (length/width) of the pressure-sensitive adhesive section 122A to the length (length) in the width direction (width) is preferably the same as that of the pressure-sensitive adhesive section 121A above.

As shown in FIG. 4, the entirety of one end 122a of the first pressure-sensitive adhesive section row 122B, the second pressure-sensitive adhesive section row 122C, and the third pressure-sensitive adhesive section row 122D in the length direction is separated from one end 11b of the substrate 11. The length of separation between one end 122a of the first and third pressure-sensitive adhesive section rows 122B and 122D, which is closest to one end 11b of the substrate 11 in the length direction, and one end 11b of the substrate 11 in the length direction is preferably between 1 mm and 5 mm, and between 2 mm and 4 mm is more preferred. In FIG. 4, the length of separation between one end 122a of the first and third pressure-sensitive adhesive section rows 122B and 122D and one end 11b of the substrate 11 in the length direction is d14, the length of separation between one end 122a of the second pressure-sensitive adhesive section row 122C and one end 11b of the substrate 11 in the length direction is d15. The d14 is preferably between 1 mm and 5 mm, and between 2 mm and 4 mm is more preferable. In addition, d14 and d15 satisfy the relationship d14<d15. If d14 is above the lower limit mentioned above, the pressure-sensitive adhesive section 122A is no longer present at one end of the seal member 10, so when peeling the release sheet 13 from the pressure-sensitive adhesive layer 122, a large peeling force is not generated and the probability of intralayer peeling of the substrate 11 is reduced. If the d14 is less than or equal to the upper limit, floating with the object is less likely to occur when the seal member 10 is bonded to the object.

When the length in the width direction of the pressure-sensitive adhesive section 122A is li at one end 122a in the length direction and the length in the width direction of the pressure-sensitive adhesive section 122A is lm at the center of the pressure-sensitive adhesive section 122A in the length direction, the relationship in the following formula (1) preferably be satisfied.

$$l_i \leq l_m \tag{1}$$

(Note that "m" indicates the position of the center of the pressure-sensitive adhesive section 122A in the length direction, and "i" indicates the position of one end 122a in the length direction of the pressure-sensitive adhesive section 122A.)

Satisfying the relationship in formula (1) above decreases the probability of the pressure-sensitive adhesive layer 122 peeling off when the release sheet 13 is peeled off. If the relationship in formula (1) above is not satisfied, the probability of the pressure-sensitive adhesive layer 122 peeling off increases when the release sheet 13 is peeled off.

The ratio of the total area of the pressure-sensitive adhesive layer 122 in plan view (the presence of the pressure-sensitive adhesive layer 122) to the total area of one side 11a of the substrate 11 is preferably between 20% and 35%, and between 25% and 30% is more preferred. If the presence rate of the pressure-sensitive adhesive layer 122 is above the lower limit above, the adhesion to the object can be well maintained. If the percentage of pressure-sensitive adhesive layer 122 present is below the above upper limit, the nonflammability is further improved. In addition, the release sheet 13 is more easily peeled off from the seal member 10.

The presence of the pressure-sensitive adhesive layer 122 is generally the same as the aperture ratio of the coating plate used to provide the pressure-sensitive adhesive layer 122 on one side 11a of the substrate 11, as described below in detail.

The thickness of the pressure-sensitive adhesive layer 122 is not particularly limited, but preferably be the same as the pressure-sensitive adhesive layer 121 above. However, the thickness will be different in cases where the amount of coating is adjusted in accordance with a change in the presence ratio of the pressure-sensitive adhesive layer 122 to the total area of one side 11a of the substrate 11.

When the length of the pressure-sensitive adhesive section 122A in the width direction is li at one end 122a in the length direction and the length of the pressure-sensitive adhesive section 122A in the width direction is lm at the center of the pressure-sensitive adhesive section 122A in the length direction, the relationship of the above formula (1) is satisfied at the moment when the peeling sheet 13 begins to peel off in the length direction, the peeling force acting on the pressure-sensitive adhesive layer 122 can be reduced. As a result, peeling of the pressure-sensitive adhesive layer 122 can be suppressed when peeling off the release sheet 13.

In FIG. 4, a case is illustrated in which, in plan view, two adhesive areas 122A are arranged in parallel in the width direction along the length direction of the substrate 11 (first area) and one adhesive area 122A is arranged in the width direction (second area), alternately. In this embodiment, in plan view, three pressure-sensitive adhesive sections 122A may be arranged in parallel in the width direction along the length direction of the substrate 11.

Second Variant

Figure 5:
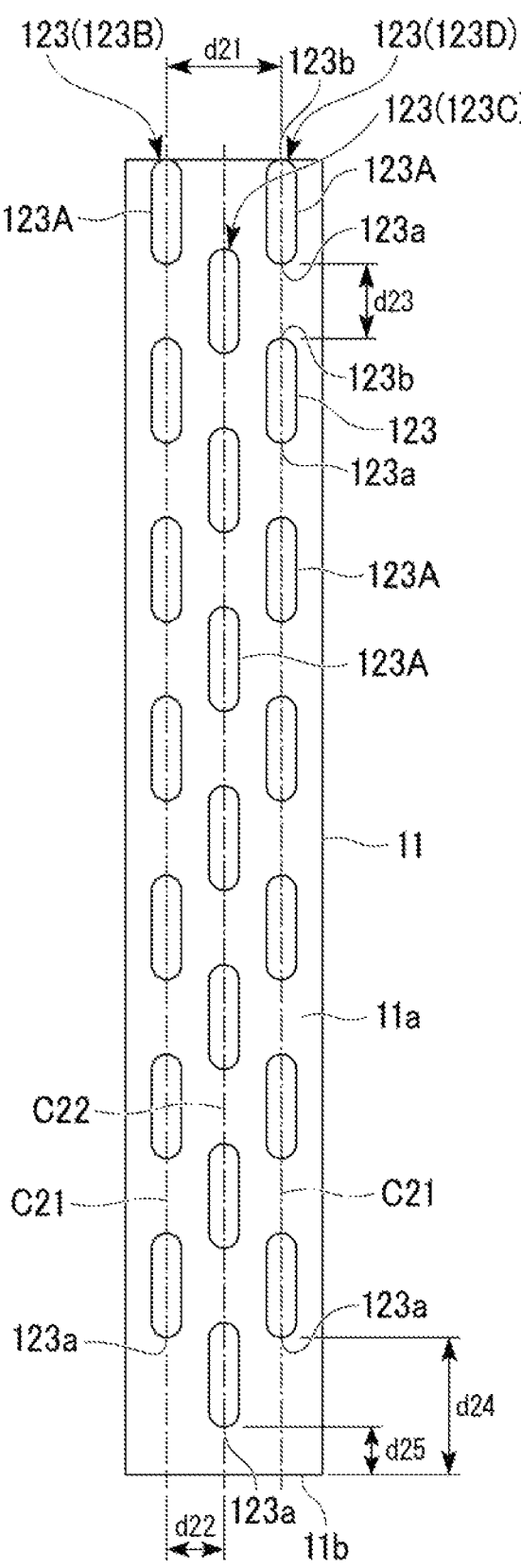
FIG. 5 is a schematic plan view of a variant of the pressure-sensitive adhesive layer comprising the seal member of one embodiment of the present invention.

In the second variant shown in FIG. 5, the resin layer 12 includes a pressure-sensitive adhesive layer 123. The pressure-sensitive adhesive layer 123 has a plurality of pressure-sensitive adhesive section rows consisting of two or more pressure-sensitive adhesive sections 123A, each independently aligned in the length direction of the substrate 11. Here is an example where the pressure-sensitive adhesive layer 123 has a first pressure-sensitive adhesive section row 123B, a second pressure-sensitive adhesive section row 123C, and a third pressure-sensitive adhesive section row 123D, each comprising a pressure-sensitive adhesive section 123A. The first pressure-sensitive adhesive section row 123B, second pressure-sensitive adhesive section row 123C, and third pressure-sensitive adhesive section row 123D are spaced apart from each other in the width direction of the substrate 11. The pressure-sensitive adhesive layer 123 consists of a plurality of pressure-sensitive adhesive sections 123A provided on one side 11a of the substrate 11 and spaced apart from each other. In other words, the pressure-sensitive adhesive layer 123 is a set of a plurality of pressure-sensitive adhesive sections 123A provided on one side 11a of the substrate 11. Pressure-sensitive adhesive section 123A comprises first pressure-sensitive adhesive section row 123B, second pressure-sensitive adhesive section row 123C, and third pressure-sensitive adhesive section row 123D. The pressure-sensitive adhesive section 123A is discontinuous in the length direction of the substrate 11 in plan view.

The pressure-sensitive adhesive section 123A is an abbreviated rounded rectangular shape extending in the length direction of the substrate 11 in plan view. In other words, the pressure-sensitive adhesive section 123A is, in plan view, a shape consisting of a rectangle extending in the length direction of the substrate 11 and semicircles connected to each end thereof, with both ends convex in the length direction. The pressure-sensitive adhesive sections 123A are arranged in a plurality of discontinuous positions along the length direction of the substrate 11 in plan view. The first pressure-sensitive adhesive section row 123B, the second pressure-sensitive adhesive section row 123C, and the third pressure-sensitive adhesive section row 123D are arranged discontinuously in the width direction of the substrate 11 in plan view. Furthermore, on one side 11a of the substrate 11, in plan view, along the length direction of the substrate 11, an area in which two pressure-sensitive adhesive sections

123A are arranged in parallel in the width direction (first area) and an area in which one pressure-sensitive adhesive section 123A is arranged in the width direction (second area) are alternately formed. The pressure-sensitive adhesive section 123A in the second region is located along the length direction of the substrate 11 and on the center line C22 passing through the middle of the two pressure-sensitive adhesive sections 123A in the first region.

In the first region, the distance in the width direction of the substrate 11 between two adjacent pressure-sensitive adhesive sections 123A (d21 shown in FIG. 5) is adjusted so that the ratio of the total area of the pressure-sensitive adhesive layer 123 in plan view (the presence of the pressure-sensitive adhesive layer 123) to the total area of one side 11a of the substrate 11 is between 20% and 35%. In the first area, the distance in the width direction of the substrate 11 between two adjacent pressure-sensitive adhesive sections 123A (d21 shown in FIG. 5) is adjusted so that the ratio of the length (length/width) of the pressure-sensitive adhesive section 123A in the length direction (length) to the length (width) in the width direction (length) is between 1.1 and 999.

The aforementioned d21 is the length between the center lines C21 along the length direction of the two adjacent pressure-sensitive adhesive sections 123A in the first region.

The spacing in the width direction of the substrate 11 between the pressure-sensitive adhesive section 123A in the first region and the pressure-sensitive adhesive section 123A in the second region adjacent to the first region (d22 shown in FIG. 5) is adjusted such that the ratio of the total area of the pressure-sensitive adhesive layer 123 in plan view (the presence of the pressure-sensitive adhesive layer 123) to the total area of one side 11a of the substrate 11 is between 20% and 35. The distance in the width direction of the substrate 11 between the pressure-sensitive adhesive section 123A in the first region and the pressure-sensitive adhesive section 123A in the second region adjacent to the first region (d22 shown in FIG. 5) is adjusted so that the ratio of the length (length/width) of the pressure-sensitive adhesive section 123A in the length direction (length) to the length (width) of the pressure-sensitive adhesive section 123A in the width direction (length) is between 1.1 and 999 The ratio of the length (length/width) of the pressure-sensitive adhesive section 123A to the length (width) of the length direction is between 1.1 and 999.

The aforementioned d22 is the length between the center line C21 along the length direction of the pressure-sensitive adhesive section 123A in the first region and the center line C22 along the length direction of the pressure-sensitive adhesive section 123A in the second region adjacent to the first region.

In the length direction of the substrate 11, the distance between two adjacent pressure-sensitive adhesive sections 123A (d23 shown in FIG. 5) is adjusted so that the ratio of the total area of the pressure-sensitive adhesive layer 123 in plan view (the presence of the pressure-sensitive adhesive layer 123) to the total area of one side 11a of the substrate 11 is between 20% and 35%. In the length direction of the substrate 11, the distance between two adjacent pressure-sensitive adhesive sections 123A (d23 shown in FIG. 5) is adjusted so that the ratio of the length (length/width) of the pressure-sensitive adhesive section 123A to the length (width) in the width direction of the pressure-sensitive adhesive section 123A (length) is between 1.1 and 999.

The aforementioned d23 is the length between one end 123$a$ of the two adjacent pressure-sensitive adhesive sections 123A and the other end 123$b$ in the length direction of the substrate 11.

In this embodiment, for example, the pressure-sensitive adhesive section 123A of the first pressure-sensitive adhesive section row 123B preferably overlaps at least partially with the pressure-sensitive adhesive section 123A of the adjacent second pressure-sensitive adhesive section row 123C in the width direction of the substrate 11. This reduces uneven adhesion of the release sheet 13 to the pressure-sensitive adhesive layer 123 and reduces partial loss of adhesive strength.

The ratio of the length (length/width) of the pressure-sensitive adhesive section 123A to the length (length) in the width direction (width) is preferably the same as that of the pressure-sensitive adhesive section 121A above.

As shown in FIG. 5, the entirety of one end 123$a$ of the first pressure-sensitive adhesive section row 123B, the second pressure-sensitive adhesive section row 123C, and the third pressure-sensitive adhesive section row 123D in the length direction is separated from one end 11$b$ of the substrate 11. The length of separation between one end 123$a$ of the second pressure-sensitive adhesive section row 123C closest to one end 11$b$ in the length direction of the substrate 11 and one end 11$b$ in the length direction of the substrate 11 is preferably between 1 mm and 5 mm, and more preferably between 2 mm and 4 mm. In FIG. 5, the length of separation between one end of the first and third pressure-sensitive adhesive section rows 123B and 123D in the length direction and one end of the substrate 11$b$ in the length direction is d24, the length of separation between one end of the second pressure-sensitive adhesive section row 123C in the length direction and d25. D25 is preferably 1 mm or more and 5 mm or less, and between 2 mm and 4 mm is more preferable. In addition, d24 and d25 satisfy the relationship d25<d24. If d25 is greater than the lower limit mentioned above, the pressure-sensitive adhesive section 123A is no longer present at one end of the seal member 10, so when peeling the release sheet 13 from the pressure-sensitive adhesive layer 123, a large peeling force is not generated and the probability of intralayer peeling of the substrate 11 is reduced. If the d25 is less than or equal to the upper limit, floating with the object is less likely to occur when the seal member 10 is bonded to the object.

When the length in the width direction of the pressure-sensitive adhesive section 123A is li at one end 123$a$ in the length direction of the pressure-sensitive adhesive section 123A and the length in the width direction of the pressure-sensitive adhesive section 123A is lm at the center of the pressure-sensitive adhesive section 123A in the length direction, the relationship in the above formula (1) preferably be satisfied.

The ratio of the total area of the pressure-sensitive adhesive layer 123 in plan view (the presence of the pressure-sensitive adhesive layer 123) to the total area of one side 11$a$ of the substrate 11 is preferably between 20% and 35%, and between 25% and 30% is more preferred. If the percentage of pressure-sensitive adhesive layer 123 is above the lower limit above, the adhesion to the object can be well maintained. If the percentage of pressure-sensitive adhesive layer 123 present is below the above upper limit, the nonflammability is further improved. In addition, it is easier to peel off the release sheet 13 from the seal member 10.

The presence of the pressure-sensitive adhesive layer 123 is generally the same as the aperture ratio of the coating plate used to provide the pressure-sensitive adhesive layer 123 on one side 11$a$ of the substrate 11, as described below in detail.

The thickness of the pressure-sensitive adhesive layer 123 is not particularly limited, but preferably be the same as the pressure-sensitive adhesive layer 121 above. However, the thickness will be different in cases where the amount of coating is adjusted in accordance with a change in the presence ratio of the pressure-sensitive adhesive layer 123 to the total area of one side 11$a$ of the substrate 11.

In FIG. 5, the case is illustrated in which, in plan view, along the length direction of the substrate 11, two adhesive areas 123A are arranged in parallel in the width direction (first area) and one adhesive area 123A is arranged in the width direction (second area) alternately, but this embodiment is not limited to this. In this embodiment, in plan view, three pressure-sensitive adhesive sections 123A may be arranged in parallel in the width direction along the length direction of the substrate 11.

Third Variant

Figure 6:
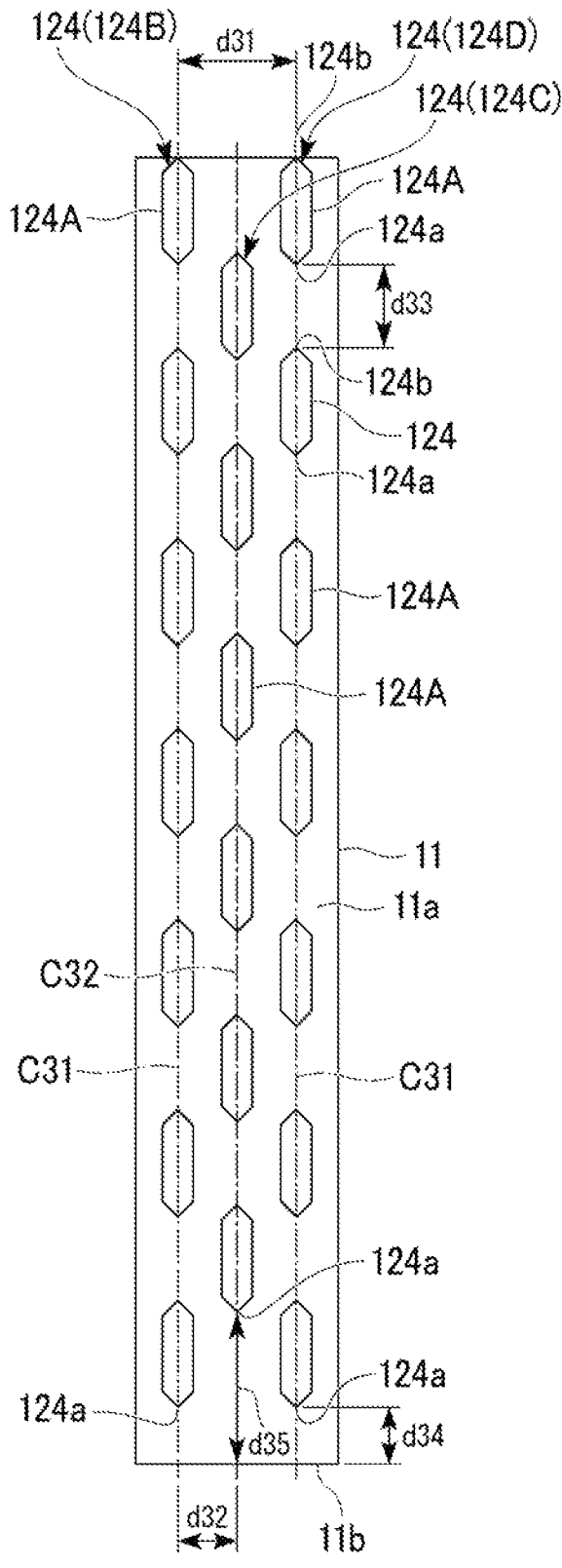
FIG. 6 is a plan view schematically shows a variant of the pressure-sensitive adhesive layer that constitutes the seal member of one embodiment of the present invention.

In the third variant shown in FIG. 6, the resin layer 12 includes a pressure-sensitive adhesive layer 124. The pressure-sensitive adhesive layer 124 has a plurality of pressure-sensitive adhesive section rows consisting of two or more pressure-sensitive adhesive sections 124A, each independently aligned in the length direction of the substrate 11. Here is an example where the pressure-sensitive adhesive layer 124 has a first pressure-sensitive adhesive section row 124B, a second pressure-sensitive adhesive section row 124C, and a third pressure-sensitive adhesive section row 124D, each comprising a pressure-sensitive adhesive section 124A. The first pressure-sensitive adhesive section row 124B, second pressure-sensitive adhesive section row 124C, and third pressure-sensitive adhesive section row 124D are spaced apart from each other in the width direction of the substrate 11. The pressure-sensitive adhesive layer 124 consists of a plurality of pressure-sensitive adhesive sections 124A provided on one side 11$a$ of the substrate 11 and spaced apart from each other. In other words, the pressure-sensitive adhesive layer 124 is a set of a plurality of pressure-sensitive adhesive sections 124A provided on one side 11$a$ of the substrate 11. Pressure-sensitive adhesive section 124A comprises first pressure-sensitive adhesive section row 124B, second pressure-sensitive adhesive section row 124C, and third pressure-sensitive adhesive section row 124D. The pressure-sensitive adhesive section 124A is discontinuous in the length direction of the substrate 11 in plan view.

The pressure-sensitive adhesive section 124A is hexagonal in plan view, extending in the length direction of the substrate 11. In other words, the pressure-sensitive adhesive section 124A is shaped in plan view to consist of a rectangle extending in the length direction of the substrate 11 and triangles connected to each end thereof, with both ends convex in the length direction. The pressure-sensitive adhesive sections 124A are arranged discontinuously along the length direction of the substrate 11 in plan view. The first pressure-sensitive adhesive section row 124B, the second pressure-sensitive adhesive section row 124C, and the third pressure-sensitive adhesive section row 124D are arranged discontinuously in the width direction of the substrate 11 in plan view. Furthermore, on one side 11$a$ of the substrate 11, in plan view, along the length direction of the substrate 11, an area in which two pressure-sensitive adhesive sections 124A are arranged in parallel in the width direction (first area) and an area in which one pressure-sensitive adhesive section 124A is arranged in the width direction (second area) are formed alternately. The pressure-sensitive adhesive section 124A in the second region is located along the length direction of the substrate 11 and on the center line C32 passing through the middle of the two pressure-sensitive adhesive sections 124A in the first region.

In the first region, the distance in the width direction of the substrate 11 between the two adjacent pressure-sensitive adhesive sections 124A (d31 shown in FIG. 6) is adjusted so that the ratio of the total area of the pressure-sensitive adhesive layer 124 in plan view (the presence of the pressure-sensitive adhesive layer 124) to the total area of one side 11a of the substrate 11 is between 20% and 35%. In the first area, the distance in the width direction of the substrate 11 between two adjacent pressure-sensitive adhesive sections 124A (d31 shown in FIG. 6) is adjusted so that the ratio of the length (length/width) of the pressure-sensitive adhesive section 124A in the length direction of its length (length) to its width (width) is between 1.1 and 999.

The aforementioned d31 is the length between the center lines C31 along the length direction of the two adjacent pressure-sensitive adhesive sections 124A in the first region.

The spacing in the width direction of the substrate 11 between the pressure-sensitive adhesive section 124A in the first region and the pressure-sensitive adhesive section 124A in the second region adjacent to the first region (d32 shown in FIG. 6) is adjusted such that the ratio of the total area of the pressure-sensitive adhesive layer 124 in plan view (the presence of the pressure-sensitive adhesive layer 124) to the total area of one side 11a of the substrate 11 is between 20% and 35. The distance in the width direction of the substrate 11 between the pressure-sensitive adhesive section 124A in the first region and the pressure-sensitive adhesive section 124A in the second region adjacent to the first region (d32 shown in FIG. 6) is adjusted so that the ratio of the length (length/width) of the pressure-sensitive adhesive section 124A in the length direction (length) to the length (width) of the pressure-sensitive adhesive section 124A in the width direction (length) is between 1.1 and 999 The ratio of the length (length/width) of the pressure-sensitive adhesive section 124A to the length (length) of the length direction (width) of the pressure-sensitive adhesive section 124A is between 1.1 and 999.

The aforementioned d32 is the length between the center line C31 along the length direction of the pressure-sensitive adhesive section 124A in the first region and the center line C32 along the length direction of the pressure-sensitive adhesive section 124A in the second region adjacent to the first region.

In the length direction of the substrate 11, the distance between two adjacent pressure-sensitive adhesive sections 124A (d33 shown in FIG. 6) is adjusted so that the ratio of the total area of the pressure-sensitive adhesive layer 124 in plan view (the presence of the pressure-sensitive adhesive layer 124) to the total area of one side 11a of the substrate 11 is between 20% and 35%. In the length direction of the substrate 11, the distance between two adjacent pressure-sensitive adhesive sections 124A (d33 shown in FIG. 6) is adjusted so that the ratio of the length (length/width) of the pressure-sensitive adhesive section 124A in the length direction to the length (width) in the width direction of the pressure-sensitive adhesive section 124A is between 1.1 and 999.

The aforementioned d33 is the length between one end 124a and the other end 124b of the two adjacent pressure-sensitive adhesive sections 124A in the length direction of the substrate 11.

In this embodiment, for example, the pressure-sensitive adhesive section 124A of the first pressure-sensitive adhesive section row 124B preferably overlaps at least partially with the pressure-sensitive adhesive section 124A of the adjacent second pressure-sensitive adhesive section row 124C in the width direction of the substrate 11. This reduces uneven adhesion of the release sheet 13 to the pressure-sensitive adhesive layer 124 and reduces partial loss of adhesive strength.

The ratio of the length (length/width) of the pressure-sensitive adhesive section 124A to the length (length) in the width direction (width) is preferably the same as that of the pressure-sensitive adhesive section 121A above.

As shown in FIG. 6, the entirety of one end 124a of the first pressure-sensitive adhesive section row 124B, the second pressure-sensitive adhesive section row 124C, and the third pressure-sensitive adhesive section row 124D in the length direction is separated from one end 11b of the substrate 11. The length of separation between one end 124a of the first pressure-sensitive adhesive section row 124B and the third pressure-sensitive adhesive section row 124D closest to one end 11b in the length direction of the substrate 11 and one end 11b in the length direction of the substrate 11 is preferably between 1 mm and 5 mm, and between 2 mm and 4 mm is more preferred. In FIG. 6, the length of separation between one end 124a of the first and third pressure-sensitive adhesive section rows 124B and 124D and one end 11b of the substrate 11 in the length direction is d34, the length of separation between one end 124a of the second pressure-sensitive adhesive section row 124C and one end 11b of the substrate 11 in the length direction is d35. D34 is preferably 1 mm or more and 5 mm or less, and between 2 mm and 4 mm is more preferable. In addition, d34 and d35 satisfy the relationship d34<d35. If the above d34 is above the lower limit, the pressure-sensitive adhesive section 124A is no longer present at one end of the seal member 10, so when peeling the release sheet 13 from the pressure-sensitive adhesive layer 124, a large peeling force is not generated and the probability of intralayer peeling of the substrate 11 is reduced. If the d34 is less than or equal to the upper limit, floating with the object is less likely to occur when the seal member 10 is bonded to the object.

When the length in the width direction of the pressure-sensitive adhesive section 124A is li at one end 124a in the length direction and the length in the width direction of the pressure-sensitive adhesive section 124A is lm at the center of the pressure-sensitive adhesive section 124A in the length direction, the relationship in the above formula (1) preferably be satisfied.

The ratio of the total area of the pressure-sensitive adhesive layer 124 in plan view (the presence of the pressure-sensitive adhesive layer 124) to the total area of one side 11a of the substrate 11 is preferably between 20% and 35%, and between 25% and 30% is more preferred. If the presence rate of the pressure-sensitive adhesive layer 124 is above the lower limit above, the adhesion to the object can be well maintained. If the percentage of pressure-sensitive adhesive layer 124 present is below the above upper limit, the nonflammability is further improved. In addition, it is easier to peel off the release sheet 13 from the seal member 10.

The presence of the pressure-sensitive adhesive layer 124 is generally the same as the aperture ratio of the coating plate used to provide the pressure-sensitive adhesive layer 124 on one side 11a of the substrate 11, as described below in detail.

The thickness of the pressure-sensitive adhesive layer 124 is not particularly limited, but preferably be the same as the pressure-sensitive adhesive layer 121 above. However, the thickness will be different in cases where the amount of coating is adjusted in accordance with a change in the presence ratio of the pressure-sensitive adhesive layer 124 to the total area of one side 11*a* of the substrate 11.

In FIG. 6, a case is illustrated in which, in plan view, along the length direction of the substrate 11, an area in which two pressure-sensitive adhesive sections 124A are arranged in parallel in the width direction (first area) and an area in which one pressure-sensitive adhesive section 124A is arranged in the width direction (second area) are alternately formed, but this embodiment is not limited to this. In this embodiment, in plan view, three pressure-sensitive adhesive sections 124A may be arranged in parallel in the width direction along the length direction of the substrate 11.

Fourth Variant

Figure 7:
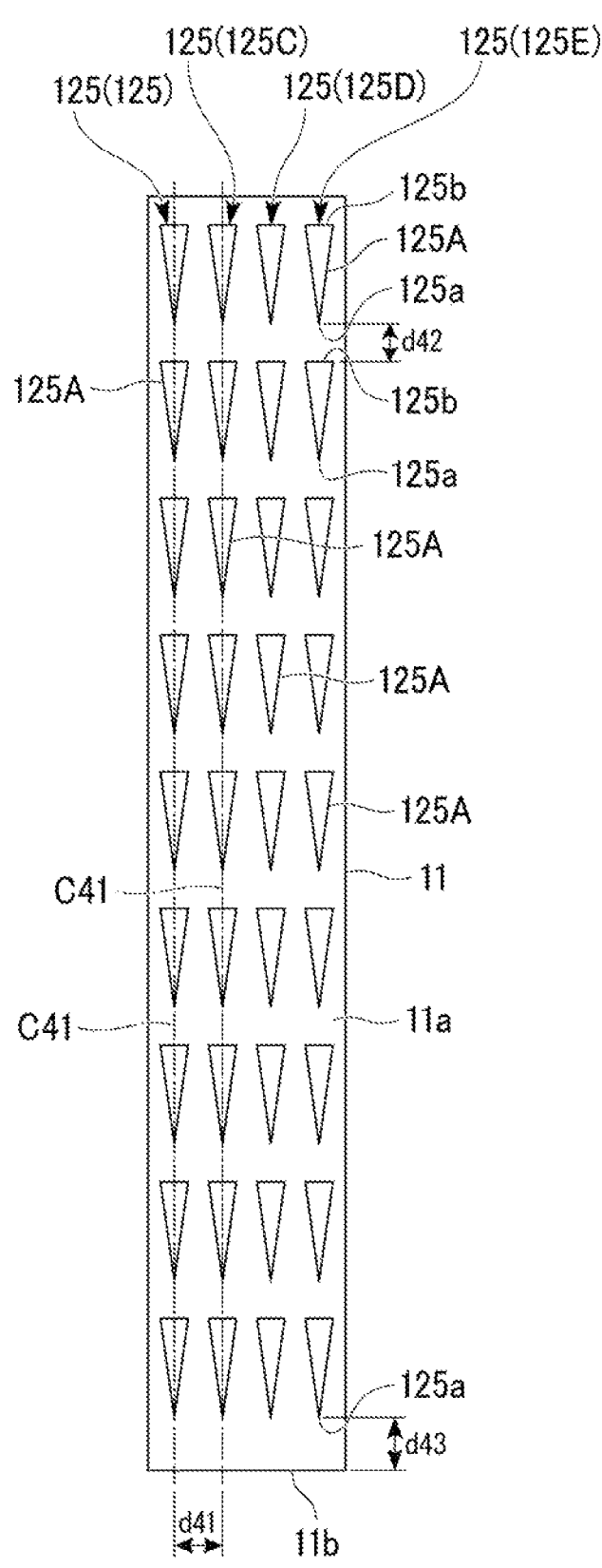
FIG. 7 is a schematic plan view of a variant of the pressure-sensitive adhesive layer that constitutes the seal member of one embodiment of the present invention.

In the fourth variant shown in FIG. 7, the resin layer 12 includes a pressure-sensitive adhesive layer 125. The pressure-sensitive adhesive layer 125 has a plurality of pressure-sensitive adhesive section rows consisting of two or more pressure-sensitive adhesive sections 125A, each independently aligned in the length direction of the substrate 11. Here is an example where the pressure-sensitive adhesive layer 125 has a first pressure-sensitive adhesive section row 125B, a second pressure-sensitive adhesive section row 125C, a third pressure-sensitive adhesive section row 125D, and a fourth pressure-sensitive adhesive section row 125E, each comprising a pressure-sensitive adhesive section 125A. The first pressure-sensitive adhesive section row 125B, second pressure-sensitive adhesive section row 125C, third pressure-sensitive adhesive section row 124D, and fourth pressure-sensitive adhesive section row 125E are spaced apart from each other in the width direction of the substrate 11. The pressure-sensitive adhesive layer 125 consists of a plurality of pressure-sensitive adhesive sections 125A provided on one side 11*a* of the substrate 11, spaced apart from each other. In other words, the pressure-sensitive adhesive layer 125 is a set of multiple pressure-sensitive adhesive sections 125A provided on one side 11*a* of the substrate 11. Pressure-sensitive adhesive section 125A comprises first pressure-sensitive adhesive section row 125B, second pressure-sensitive adhesive section row 125C, third pressure-sensitive adhesive section row 125D, and fourth pressure-sensitive adhesive section row 125E. The pressure-sensitive adhesive section 125A is discontinuous in the length direction of the substrate 11 in plan view.

The pressure-sensitive adhesive section 125A is triangular in plan view, extending in the length direction of the substrate 11. In other words, the pressure-sensitive adhesive section 125A is isosceles triangular in plan view, with the apex angle located at one end 11*b* in the length direction of the substrate 11. The pressure-sensitive adhesive sections 125A are arranged discontinuously along the length direction of the substrate 11 in plan view. The first pressure-sensitive adhesive section row 125B, second pressure-sensitive adhesive section row 125C, third pressure-sensitive adhesive section row 124D, and fourth pressure-sensitive adhesive section row 125E are arranged discontinuously in the width direction of the substrate 11 in plan view.

In the width direction of the substrate 11, the distance between two adjacent pressure-sensitive adhesive sections 125A (d41 shown in FIG. 7) is adjusted so that the ratio of the total area of the pressure-sensitive adhesive layer 125 in plan view (the presence of the pressure-sensitive adhesive layer 125) to the total area of one side 11*a* of the substrate 11 is between 20% and 35%. In the width direction of the substrate 11, the distance between two adjacent pressure-sensitive adhesive sections 125A (d41 shown in FIG. 7) is adjusted so that the ratio of the length (length/width) of the pressure-sensitive adhesive section 125A in the length direction (length) to the length (width) in the width direction (width) is between 1.1 and 999.

The aforementioned d41 is the length between the center lines C41 along the respective length directions of the two adjacent pressure-sensitive adhesive sections 125A in the width direction of the substrate 11.

In the length direction of the substrate 11, the distance between two adjacent pressure-sensitive adhesive sections 125A (d42 shown in FIG. 7) is adjusted so that the ratio of the total area of the pressure-sensitive adhesive layer 125 in plan view (the percentage of the pressure-sensitive adhesive layer 125 present) to the total area of one side 11*a* of the substrate 11 is between 20% and 35%. In the length direction of the substrate 11, the distance between two adjacent pressure-sensitive adhesive sections 125A (d42 shown in FIG. 7) is adjusted so that the ratio of the length (length/width) of the pressure-sensitive adhesive section 125A to the length (width) in the width direction of the pressure-sensitive adhesive section 125A is between 1.1 and 999.

The aforementioned d42 is the length between one end 125*a* and the other end 125*b* of the two adjacent pressure-sensitive adhesive sections 125A in the length direction of the substrate 11.

In this embodiment, for example, the pressure-sensitive adhesive section 125A of the first pressure-sensitive adhesive section row 125B preferably overlaps at least partially with the pressure-sensitive adhesive section 125A of the adjacent second pressure-sensitive adhesive section row 125C in the width direction of the substrate 11. This reduces uneven adhesion of the release sheet 13 to the pressure-sensitive adhesive layer 121 and reduces partial loss of adhesive strength.

The ratio of the length (length/width) of the pressure-sensitive adhesive section 125A to the length (length) in the width direction (width) at the other end 125*b* of the pressure-sensitive adhesive section 125A preferably be the same as that of the pressure-sensitive adhesive section 121A above.

As shown in FIG. 7, the entirety of one end 125*a* of the first pressure-sensitive adhesive section row 125B, the second pressure-sensitive adhesive section row 125C, the third pressure-sensitive adhesive section row 125D, and the fourth pressure-sensitive adhesive section row 125E in the length direction is separated from one end 11*b* of the substrate 11. The length of separation between one end 125*a* of the first pressure-sensitive adhesive section row 125B, the second pressure-sensitive adhesive section row 125C, the third pressure-sensitive adhesive section row 125D and the fourth pressure-sensitive adhesive section row 125E closest to one end 11*b* in the length direction of the substrate 11 and one end 11*b* in the length direction of the substrate 11 is preferably between 1 mm and 5 mm, between 2 mm to 4 mm or more is more preferred. In FIG. 7, d43 is the length of separation between one end 125*a* of the first pressure-sensitive adhesive section row 125B, the second pressure-sensitive adhesive section row 125C, the third pressure-sensitive adhesive section row 125D, and the fourth pressure-sensitive adhesive section row 125E in the length direction and one end 11*b* of the substrate 11. The d43 is preferably 1 mm or more and 5 mm or less, and between 2 mm and 4 mm is more preferable. If d43 is above the lower limit, the pressure-sensitive adhesive section 125A is no longer present at one end of the seal member 10, so when peeling the release sheet 13 from the pressure-sensitive adhesive layer 125, a large peeling force is not generated and the probability of intralayer peeling of the substrate 11 is reduced. If the d43 is less than or equal to the upper limit, floating with the object is less likely to occur when the seal member 10 is bonded to the object.

When the length in the width direction of the pressure-sensitive adhesive section 125A is li at one end 125a in the length direction of the pressure-sensitive adhesive section 125A and the length in the width direction of the pressure-sensitive adhesive section 125A is lm at the center of the pressure-sensitive adhesive section 125A in the length direction, the relationship in the above formula (1) preferably be satisfied.

The ratio of the total area of the pressure-sensitive adhesive layer 125 in plan view (the presence of the pressure-sensitive adhesive layer 125) to the total area of one side 11a of the substrate 11 is preferably between 20% and 35%, and between 25% and 30% is more preferred. If the presence rate of the pressure-sensitive adhesive layer 125 is above the lower limit above, the adhesion to the object can be well maintained. If the percentage of pressure-sensitive adhesive layer 125 present is below the above upper limit, the nonflammability is further improved. In addition, it is easier to peel off the release sheet 13 from the seal member 10.

The presence of the pressure-sensitive adhesive layer 125 is generally the same as the presence of the coating plate used to provide the pressure-sensitive adhesive layer 125 on one side 11a of the substrate 11, as described below in detail.

The thickness of the pressure-sensitive adhesive layer 125 is not particularly limited, but preferably be the same as the pressure-sensitive adhesive layer 121 above. However, the thickness will be different in cases where the amount of coating is adjusted in accordance with a change in the presence ratio of the pressure-sensitive adhesive layer 125 to the total area of one side 11a of the substrate 11.

In FIG. 7, the case in which all of the adjacent pressure-sensitive adhesive sections 125A overlaps in the width direction of the substrate 11 is illustrated, but this embodiment is not limited to this. In this embodiment, in plan view, adjacent pressure-sensitive adhesive sections 125A may overlap at least partially in the width direction of the substrate 11.

Fifth Variant

Figure 8:
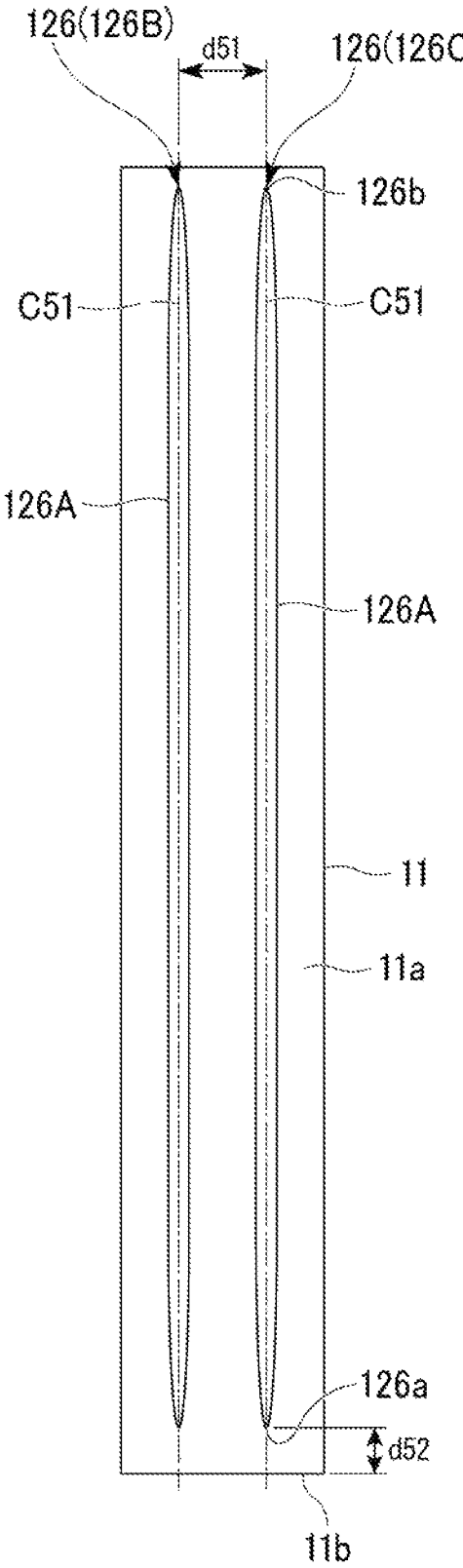
FIG. 8 is a schematic plan view of a variant of the pressure-sensitive adhesive layer that constitutes the seal member of one embodiment of the present invention.

In the fifth variant shown in FIG. 8, the resin layer 12 includes a pressure-sensitive adhesive layer 126. The pressure-sensitive adhesive layer 126 has multiple rows of pressure-sensitive adhesive sections, each consisting of one pressure-sensitive adhesive section 126A that independently extends in the length direction of the substrate 11. Here is an example where the pressure-sensitive adhesive layer 126 has a first adhesive row 126B and a second adhesive row 126C, each comprising a pressure-sensitive adhesive section 126A. The first pressure-sensitive adhesive section row 126B and the second pressure-sensitive adhesive section row 126C are spaced apart from each other in the width direction of the substrate 11. The pressure-sensitive adhesive layer 126 consists of two pressure-sensitive adhesive sections 126A provided on one side 11a of the substrate 11, spaced apart from each other. In other words, the pressure-sensitive adhesive layer 126 is a set of two pressure-sensitive adhesive sections 126A provided on one side 11a of the substrate 11. The pressure-sensitive adhesive section 126A constitutes the first pressure-sensitive adhesive section row 126B and the second pressure-sensitive adhesive section row 126C. In plan view, the pressure-sensitive adhesive section 126A is continuous in the length direction of the substrate 11.

The pressure-sensitive adhesive section 126A is linear in plan view, extending in the length direction of the substrate 11. In other words, the pressure-sensitive adhesive section 126A is linear in plan view, with both ends of the rectangle tapering in width as they move outward, respectively. The pressure-sensitive adhesive sections 126A are arranged continuously along the length direction of the substrate 11 in plan view. The pressure-sensitive adhesive sections 126A are arranged discontinuously in the width direction of the substrate 11 in plan view.

In the width direction of the substrate 11, the distance between the two adjacent pressure-sensitive adhesive sections 126A of the substrate 11 (d51 shown in FIG. 8) is adjusted so that the ratio of the total area of the pressure-sensitive adhesive layer 126 in plan view (the percentage of the pressure-sensitive adhesive layer 126 present) to the total area of one side 11a of the substrate 11 is between 20% and 35%. In the width direction of the substrate 11, the distance between two adjacent pressure-sensitive adhesive sections 126A of the substrate 11 (d51 shown in FIG. 8) is adjusted so that the ratio (length/width) of the length (length) of the pressure-sensitive adhesive section 126A in the length direction to the length (width) of the substrate 11 in the width direction is between 1.1 and 999.

The aforementioned d51 is the length between the center lines C51 along the length direction of each of the two adjacent pressure-sensitive adhesive sections 126A in the width direction of the substrate 11.

The ratio of the length (length/width) of the pressure-sensitive adhesive section 126A to the length (length) of the pressure-sensitive adhesive section 126A in the width direction (width) preferably be the same as that of the pressure-sensitive adhesive section 121A above.

As shown in FIG. 8, the entirety of one end 126a of the first or second pressure-sensitive adhesive section row 126B or 126C in the length direction is separated from one end 11b of the substrate 11. The length of separation between one end 126a of the first or second pressure-sensitive adhesive section row 126B or 126C closest to one end 11b of the substrate 11 in the length direction and one end 11b of the substrate 11 is preferably between 1 mm and 5 mm, and between 2 mm and 4 mm is more preferred. In FIG. 8, d52 is the length of separation between one end 126a in the length direction of the first or second pressure-sensitive adhesive section row 126B or 126C and one end 11b in the length direction of the substrate 11. The d52 is preferably 1 mm or more and 5 mm or less, and between 2 mm and 4 mm is more preferable. If d52 is above the lower limit, the pressure-sensitive adhesive section 126A is no longer present at one end of the seal member 10, so when peeling the release sheet 13 from the pressure-sensitive adhesive layer 126, a large peeling force is not generated and the probability of intralayer peeling of the substrate 11 is reduced. If the d52 is less than or equal to the upper limit, floating due to non-adhesion between the edge of the seal member 10 and the object is less likely to occur when the seal member 10 is adhered to the object.

When the length in the width direction of the pressure-sensitive adhesive section 126A is li at one end 126a in the length direction of the pressure-sensitive adhesive section 126A and the length in the width direction of the pressure-sensitive adhesive section 126A is lm at the center in the length direction of the pressure-sensitive adhesive section 126A, the relationship in the above formula (1) preferably be satisfied.

The ratio of the total area of the pressure-sensitive adhesive layer 126 in plan view (the presence of the pressure-sensitive adhesive layer 126) to the total area of one side 11a of the substrate 11 is preferably between 20% and 35%, and between 25% and 30% is more preferred. If the presence rate of the pressure-sensitive adhesive layer 126 is above the lower limit above, the adhesion to the object can be well maintained. If the percentage of pressure-sensitive adhesive layer 126 present is below the above upper limit, the nonflammability is further improved. In addition, it is easier to peel off the release sheet 13 from the seal member 10.

The presence of the pressure-sensitive adhesive layer 126 is generally the same as the presence of the coating plate used to provide the pressure-sensitive adhesive layer 126 on one side 11a of the substrate 11, as described below in detail.

The thickness of the pressure-sensitive adhesive layer 126 is not particularly limited, but preferably be the same as the pressure-sensitive adhesive layer 121 above. However, the thickness will be different in cases where the amount of coating is adjusted in accordance with a change in the presence ratio of the pressure-sensitive adhesive layer 126 to the total area of one side 11a of the substrate 11.

EXAMPLE

The following examples and comparative examples will further illustrate the invention in detail, but the invention is not limited to the following examples.

[Measurement and Evaluation]

<Noncombustibility Evaluation>

After peeling off the release sheet from the seal member, a noncombustibility test was conducted using a con calorimeter (manufactured by Toyo Seiki Co., Ltd.) in accordance with ISO 5660-1, and noncombustibility was evaluated using the following evaluation criteria.

AA: All three of the following items are met

B: Two of the following three items are met.

C: Two or more of the following three items are not met.

[Item]

The total calorific value is less than 8 MJ/m$^2$.

No cracks or holes penetrating to the back surface that are detrimental to fire protection.

The maximum heating rate does not exceed 200 kw/m$^2$ for more than 10 seconds continuously.

<Evaluation of Delamination within a Layer

A pressure-sensitive adhesive layer was formed on the substrate, and a release sheet was attached to the pressure-sensitive adhesive layer to produce a seal member 12.5 mm wide and 250 mm long.

The release sheet was peeled off from the seal member in 1 second, and it was checked whether intralayer peeling caused by the phenomenon in which a part of the substrate adheres to the release sheet via the pressure-sensitive adhesive layer occurs.

The number of samples was 20, and delamination was evaluated using the following evaluation criteria.

AA: No intralaminar delamination (separation) of the substrate is observed on all 20 pieces.

O: 1 to 3 pieces of intralaminar delamination are observed in some parts of the substrate.

B: 4 to 5 pieces of intralaminar delamination are observed in a part of the substrate.

C: More than 6 pieces of intralaminar delamination or more than 1 piece of significant intralaminar delamination is observed in a part of the substrate.

<Evaluation of Pressure-Sensitive Adhesive Layer Removal

A pressure-sensitive adhesive layer was formed on the substrate, and a release sheet was attached to the pressure-sensitive adhesive layer to produce a seal member 12.5 mm wide and 250 mm long.

The release sheet was peeled off from the seal member in 1 second, and the number of pressure-sensitive adhesive layers lost from the substrate was counted to calculate the pressure-sensitive adhesive layer removal rate (T). Five seal members were used to measure the pressure-sensitive adhesive layer take-up rate (T), and the average value of each pressure-sensitive adhesive layer take-up rate (T) was calculated. The following evaluation criteria were used to evaluate the pressure-sensitive adhesive layer removal.

AA: $T \leq 1\%$,

A: $1\% < T \leq 2\%$,

B: $2\% < T \leq 5\%$,

C: $5\% < T$,

<Evaluation of Adhesion

A pressure-sensitive adhesive layer was formed on the substrate, and a release sheet was attached to the pressure-sensitive adhesive layer to produce a seal member 12.5 mm wide and 250 mm long.

The release sheet was peeled off from the seal member and attached to a perforated metal plate made of stainless steel (60° staggered type, hole diameter 5 mm, aperture ratio 40.3%) so that the pressure-sensitive adhesive layer is in contact, and left under a pressure of 0.2 N/cm$^2$ for 30 minutes, The perforated metal plate was stood vertically and left for 24 hours at 10° C. and 15% RH, and adhesion was evaluated based on the following evaluation criteria.

AA: Neither the substrate nor the resin layer peeled off from the perforated metal plate.

O: Part of the substrate and resin layer is peeling off from the perforated metal plate, but the shape is maintained and no fall-off from the perforated metal plate is observed.

B: The substrate and resin layer are not peeling off from the perforated metal plate, but some of them are floating and sagging because they cannot maintain their shape.

C: The substrate and resin layer are peeling off from the perforated metal plate.

<Evaluation of Floating During Bonding

A pressure-sensitive adhesive layer was formed on the substrate, and a release sheet was attached to the pressure-sensitive adhesive layer to produce a seal member 12.5 mm wide and 250 mm long.

The seal member was pressed and pressure bonded to a flat reinforced concrete surface with a force of 16 gf per cm$^2$ for 2 seconds, and after 24 hours, a gap (U) was observed between the seal member and reinforced concrete. The same test was repeated five times, and the floating (amount of gap) at the time of bonding was evaluated based on the following evaluation criteria.

AA: Gap quantity U=0

O: Gap amount $0 < U \leq 0.5$ mm

B: Gap amount $0.5$ mm $< U \leq 1$ mm

C: Gap amount $1$ mm $< U$

<Release Sheet Peelability Evaluation

A seal member 12.5 mm wide and 250 mm long was prepared. The center of the seal member (125 mm from the edge) was used as a fulcrum, and both ends were curved 10 mm from the fulcrum toward the release sheet side and held for 10 seconds.

AA: No peeled areas exceeding 1 mm from the substrate.

O: Flaking areas occur at a distance of more than 1 mm and less than 2 mm from the substrate.

B: Flaking areas occur at a distance of more than 2 mm and less than 3 mm from the substrate.

C: Peeling areas exceeding 3 mm in distance from the substrate occur.

<Evaluation of Release Sheet Adhesion Workability

A pressure-sensitive adhesive layer was formed on a substrate 250 mm wide and 250 mm long, and a release sheet was attached to the pressure-sensitive adhesive layer to produce a seal member 250 mm wide and 250 mm long.

Then, a rubber sheet was placed on the release sheet to adhere the release sheet to the pressure-sensitive adhesive layer.

If the release sheet is not firm enough, the pressure-sensitive adhesive layer and the release sheet are partially non-contact, causing the release sheet to float (hereinafter referred to as "release sheet floating"). When a rubber sheet is placed on the release sheet, the release sheet wrinkles, so we evaluated whether or not the release sheet floats or wrinkles based on the following evaluation criteria.

A: No lifting or wrinkling of the release sheet.

C: Floating and wrinkling of the release sheet occur.

<Overall Rating

The overall evaluation was based on the following evaluation criteria: nonflammability, peeling within the layer, adhesion, release sheet lifting during adhesion, peelability, and release sheet adhesion workability.

AA: The results of all seven evaluation items are "AA".

A: The results of all seven evaluation items are "AA" or "A", and there is a "A" in the result of one or more evaluation items.

B: The results of all seven evaluation items are "AA", "A", or "B", and the results of one or more evaluation items are "B".

C: There is an "C" in the result of one or more of the seven evaluation items.

[Substrate Preparation]

<Preparation of Substrate (I)>

The following ingredients were added: 92 parts by mass of rock wool granulated cotton (product name "Pacific Mineral Fiber Granulated Cotton" manufactured by Pacific Material Corporation) with an average fiber diameter of 3 $\mu$m to 6 $\mu$m as inorganic fiber, 0.5 parts by mass of spherical colloidal silica (product name "Snowtex O" manufactured by Nissan Chemical Co. After dispersing and mixing in water 0.5 parts by mass of a spherical colloidal silica with an average particle size of 12 $\mu$m (product name "Snowtex O" manufactured by Nissan Chemical Co., Ltd.), 5.5 parts by mass of acrylic emulsion (product name "Nipol LX852" manufactured by ZEON Corporation) as an organic binder and 0.5 parts by mass of polyacrylamide (product name "Polystron 117" manufactured by Arakawa Chemical Industries, Ltd.) as an internal paper strengthening agent, and then After dispersing and mixing in water, 1.5 mass parts of styrene resin (product name "CERAFIX ST" manufactured by Meisei Chemical Industry Co.

The extracted slurry was wet-extracted using a hand-extracting square sheet machine and dried at 150° C. to obtain a substrate (I) in sheet form with a basis weight of 2000 g/m$^2$, 10 mm thick, 250 mm wide and 250 mm long.

The basis weight of the organic component in the substrate (I) was 150 g/m$^2$ and that of the inorganic component was 1850 g/m$^2$.

<Preparation of Substrate (II)

A sheet-like substrate (II) with a basis weight of 2000 g/m$^2$, thickness of 10 mm, width of 250 mm, and length of 250 mm was obtained in the same manner as substrate (I), except that the amount of inorganic fiber was changed to 88.5 mass parts and the amount of organic binder was changed to 9 mass parts.

The basis weight of the organic component in substrate (II) was 220 g/m$^2$ and that of the inorganic component was 1780 g/m$^2$.

<Preparation of Release Sheet A

A 15 $\mu$m thick polyethylene film was laminated to one side of a fine paper with a basis weight of 44 g/m$^2$. A silicone release agent was then applied on the polyethylene film. As the silicone mold release agent, a solution was prepared by diluting 100 parts by mass of KS-856 made by Shin-Etsu Chemical and 1 part by mass of cross-linking agent CAT-PL-50T with toluene to a 10% concentration. The silicone release agent was applied to the polyethylene film with a bar coater so that the coating amount after drying was 0.75 g/m$^2$, and dried to produce release Sheet A was prepared.

The Gurley stiffness of release sheet A was MD (length direction): 0.4 mN, CD (width direction): 0.2 mN, and the peeling force was 0.8N/50 mm.

To measure the peel strength of the release sheet, take a 300 mm×400 mm release sheet, age it at 60° C./24 hours in a sealed condition, and apply adhesive (BPS8170) to the silicone-processed surface. Coating thickness 20 $\mu$m to 25 $\mu$m, dried at 100° C. for 1 minute, then laminated with PET 38 $\mu$m. After seasoning with a load of 20 g/cm$^2$ for 1 day at a temperature of 23° C. and a humidity of 65%, cut into 50 mm widths. Peel off the film side at a peeling speed of 0.3 m/min and 180° using a tensile tester, and measure the peeling force of the peeled sheet. Hereafter, the peeling force of the release sheet was performed in a similar manner.

<Preparation of Release Sheet B

A substrate consisting of fine paper with a basis weight of 55 g/m$^2$ was laminated with a 15 $\mu$m thick polyethylene film. A silicone release agent was then applied on the polyethylene film. As the silicone mold release agent, a solution was prepared by diluting 100 parts by mass of KS-856 made by Shin-Etsu Chemical and 1 part by mass of cross-linking agent CAT-PL-50T with toluene to a 10% concentration. The silicone release agent was applied to the polyethylene film by a bar coater so that the dried coating amount was 0.75 g/m$^2$, and dried to produce a release sheet with a basis weight of 70 g/m$^2$. B was prepared.

The Gurley stiffness of release sheet B was MD: 0.6 mN, CD: 0.3 mN, and the peel force was 0.8N/50 mm.

<Preparation of Release Sheet C

A substrate consisting of fine paper with a basis weight of 44 g/m$^2$ was laminated with a 15 $\mu$m thick polyethylene film. A silicone release agent was then applied on the polyethylene film. As the silicone mold release agent, a solution was prepared by diluting 100 parts by mass of KS-776A (Shin-Etsu Chemical) and 1 part by mass of cross-linking agent CAT-PL-50T with toluene to a 10% concentration. The silicone release agent was applied to a polyethylene film using a bar coater so that the dried coating amount was 0.75 g/m$^2$, and dried to produce a release sheet C The sheet was then dried.

The Gurley stiffness of peeled sheet C was MD: 0.4 mN, CD: 0.2 mN, and the peeling force was 0.5 N/50 mm.

<Release Sheet D

Release sheet D is the same as release sheet A. It was laminated so that the release sheet MD direction (Gurley rigidity 0.4 mN) and the length direction of the substrate match.

<Preparation of Release Sheet E

A substrate consisting of fine paper with a basis weight of 44 g/m$^2$ was laminated with a 15 $\mu$m thick polyethylene film.

A silicone release agent was then applied on the polyethylene film. As the silicone mold release agent, a solution was prepared by diluting 100 parts by mass of KS-3701 (Shin-Etsu Chemical) and 1 part by mass of the cross-linking agent CAT-PL-50T with toluene to a 10% concentration. The silicone release agent was applied to the polyethylene film by a bar coater so that the dried coating amount was 0.75 g/m², and dried to produce a release sheet with basis weight 59 g/m². E was prepared.

The Gurley stiffness of peeled sheet E was MD: 0.4 mN, CD: 0.2 mN, and the peeling force was 1.0 N/50 mm.

<Preparation of Release Sheet F

A substrate consisting of fine paper with a basis weight of 44 g/m² was laminated with a 15 μm thick polyethylene film. A silicone release agent was then applied on the polyethylene film. As the silicone mold release agent, a solution was prepared by diluting 100 parts by mass of KS-774 made by Shin-Etsu Chemical and 1 part by mass of cross-linking agent CAT-PL-50T with toluene to a 10% concentration. The silicone release agent was applied to the polyethylene film by a bar coater so that the dry coating amount was 0.75 g/m², and dried to produce a release sheet with basis weight 59 g/m². F was prepared. The Gurley stiffness of release sheet F was MD: 0.4 mN, CD: 0.2 mN, and the peeling force was 1.2 N/50 mm.

<Preparation of Release Sheet G

A substrate consisting of fine paper with a basis weight of 44 g/m² was laminated with a 15 μm thick polyethylene film. A silicone release agent was then applied on the polyethylene film. As the silicone mold release agent, a solution was prepared by diluting 100 parts by mass of KS-3702 made by Shin-Etsu Chemical and 1 part by mass of cross-linking agent CAT-PL-50T with toluene to a 10% concentration. The silicone release agent was applied to the polyethylene film by a bar coater so that the dried coating amount was 0.75 g/m², and dried to produce a release sheet with a basis weight of 59 g/m². G was prepared.

The Gurley stiffness of peeled sheet G was MD: 0.4 mN, CD: 0.2 mN, and the peeling force was 1.4 N/50 mm.

<Preparation of Release Sheet H

A substrate consisting of fine paper with a basis weight of 64 g/m² was laminated with a 15 μm thick polyethylene film. A silicone release agent was then applied on the polyethylene film. As the silicone mold release agent, a solution was prepared by diluting 100 parts by mass of KS-3701 (Shin-Etsu Chemical) and 1 part by mass of the cross-linking agent CAT-PL-50T with toluene to a 10% concentration. The silicone release agent was applied to the polyethylene film by a bar coater so that the dried coating amount was 0.75 g/m², and dried to produce a release sheet with a basis weight of 79 g/m². G was prepared. The Gurley stiffness of peeled sheet H was MD: 0.8 mN, CD: 0.5 mN, and the peeling force was 1.0 N/50 mm.

<Release Sheet I

Release sheet I is the same as release sheet H. It was laminated so that the release sheet MD direction (Gurley rigidity 0.8 mN) and the length direction of the substrate match.

Example 1

A through-hole with a similar shape to the pressure-sensitive adhesive section shown in FIG. 5 was made in plan view on a thick paper of 252 mm long, 252 mm wide, and 390 μm thick, so that the aperture ratio was 27%, and the length direction of the through-hole was aligned with that of the thick paper.

The coating plate is placed on one side of the substrate (I) so that the width direction of the substrate (I) and the horizontal direction of the coating plate coincide, and the length direction of the substrate (I) and the vertical direction of the coating plate coincide. A predetermined amount of a water-based acrylic emulsion (product name "ThreeBond 1549" manufactured by ThreeBond Inc.) was dropped onto the coated plate as the adhesive. While scraping off excess adhesive with a squeegee, the adhesive was poured into the through-hole of the coating plate and coated on one side of the substrate (I) so that the coating amount was 40 g/m². After coating, the film was placed in an oven at 120° C. for 10 minutes to dry, forming the resin layer including the pressure-sensitive adhesive layer shown in FIG. 5. The distance in the width direction of the substrate between the pressure-sensitive adhesive section of the first region and the pressure-sensitive adhesive section of the second region adjacent to the first region (d22 shown in FIG. 5) was 4 mm. In the length direction of the substrate, the distance between two adjacent pressure-sensitive adhesive sections (d23 shown in FIG. 5) was 6 mm. The length (vertical) of the pressure-sensitive adhesive section was 8 mm. The length of the pressure-sensitive adhesive section in the width direction (horizontal, the length of the part that is not a semicircle shape) was 2 mm. The ratio of the length (length/width) of the pressure-sensitive adhesive section in the length direction (length) to the length in the width direction (width) of the pressure-sensitive adhesive section was 4. The distance between one end of the adhesive and one end of the substrate in the length direction was 2 mm.

Next, release sheet A was used as the release sheet, and the seal member was attached on the pressure-sensitive adhesive layer so that the CD direction of release sheet A overlapped with the length direction of the substrate.

The maximum peeling force to peel the release sheet from the resin layer by a tensile load perpendicular to the adhesive surface of the resin layer and the release sheet was 0.06 N/12.5 mm. The Gurley stiffness of the peeled sheet in the length direction was 0.2 mN. The seal member was then cut by a cutting machine to obtain a seal member 12.5 mm wide and 250 mm long.

The resulting seal members were subjected to the various evaluations described above. The results are shown in Table 1.

Example 2

The same pressure-sensitive adhesive layer was provided on the same substrate as in Example 1, and Release Sheet B was used as the release sheet. The seal member was attached on the pressure-sensitive adhesive layer so that the CD direction of release sheet B overlapped with the length direction of the substrate (adhesive length direction).

The maximum peeling force to peel the release sheet from the resin layer by a tensile load perpendicular to the adhesive surface of the resin layer and the release sheet was 0.06 N/12.5 mm. The Gurley stiffness of the peeled sheet in the length direction was 0.3 mN.

The seal member was then cut by a cutting machine to obtain a seal member 12.5 mm wide and 250 mm long.

The resulting seal members were subjected to the various evaluations described above. The results are shown in Table 1.

Example 3

The same pressure-sensitive adhesive layer was provided on the same substrate as in Example 1, and Release Sheet C was used as the release sheet. The seal member was attached on the pressure-sensitive adhesive layer so that the MD direction of release sheet C overlapped with the length direction of the substrate (adhesive length direction).

The maximum peeling force to peel the release sheet from the resin layer by a tensile load perpendicular to the adhesive surface of the resin layer and the release sheet was 0.03 N/12.5 mm. The Gurley stiffness of the peeled sheet in the length direction was 0.4 mN. The seal member was then cut by a cutting machine to obtain a seal member 12.5 mm wide and 250 mm long.

The resulting seal members were subjected to the various evaluations described above. The results are shown in Table 1.

Example 4

The same pressure-sensitive adhesive layer was provided on the same substrate as in Example 1, and release sheet D was used as the release sheet. The seal member was attached on the pressure-sensitive adhesive layer so that the MD direction of the release sheet D overlapped with the length direction of the substrate (adhesive length direction).

The maximum peeling force to peel the release sheet from the resin layer by a tensile load perpendicular to the adhesive surface of the resin layer and the release sheet was 0.06 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 1.

Example 5

A through-hole with a similar shape to the pressure-sensitive adhesive section shown in FIG. 3 was made in plan view on a thick paper of 252 mm long, 252 mm wide, and 390 μm thick so that the aperture ratio was 27%, and the coating plate was made so that the length direction of the through-hole and the length direction of the thick paper coincided.

The coating plate was placed on one side of the substrate (II) so that the width direction of the substrate (II) and the horizontal direction of the coating plate coincide, and the length direction of the substrate (II) and the vertical direction of the coating plate coincide. A predetermined amount of a water-based acrylic emulsion (product name "Three-Bond 1549" manufactured by ThreeBond Inc.) was dropped onto the coated plate as the adhesive. While scraping off excess adhesive with a squeegee, the adhesive was poured into the through-hole of the coating plate and coated on one side of the substrate (II) so that the coating amount was 40 g/m². After coating, the film was placed in an oven at 120° C. for 10 minutes to dry, forming the resin layer including the pressure-sensitive adhesive layer shown in FIG. 3. The distance in the width direction of the substrate between the pressure-sensitive adhesive section in the first region and the pressure-sensitive adhesive section in the second region adjacent to the first region (d2 shown in FIG. 3) was 4.2 mm. In the length direction of the substrate, the distance between two adjacent pressure-sensitive adhesive sections (d3 shown in FIG. 3) was 6 mm. The length (vertical) of the pressure-sensitive adhesive section was 8 mm. The length of the pressure-sensitive adhesive section in the width direction (horizontal) was 2 mm.

The ratio of the length (length/width) of the pressure-sensitive adhesive section in the length direction (length) to the length in the width direction (width) of the pressure-sensitive adhesive section was 4. The distance between one end of the adhesive and one end of the substrate in the length direction was 2 mm.

Next, release sheet E was used as the release sheet. The seal member was attached on the pressure-sensitive adhesive layer so that the MD direction of release sheet E overlapped with the length direction of the substrate (adhesive length direction).

The maximum peeling force to peel the release sheet from the resin layer by a tensile load perpendicular to the adhesive surface of the resin layer and the release sheet was 0.11 N/12.5 mm. The Gurley stiffness of the peeled sheet in the length direction was 0.4 mN. The seal member was then cut by a cutting machine to obtain a seal member 12.5 mm wide and 250 mm long.

The resulting seal members were subjected to the various evaluations described above. The results are shown in Table 1.

Example 6

A through-hole with a similar shape to the pressure-sensitive adhesive section shown in FIG. 7 was made in plan view on a thick paper of 252 mm long, 252 mm wide, and 390 μm thick, so that the aperture ratio was 27%, and the length direction of the through-hole was aligned with that of the thick paper.

The coating plate is placed on one side of the substrate (I) so that the width direction of the substrate (I) and the horizontal direction of the coating plate coincide, and the length direction of the substrate (I) and the vertical direction of the coating plate coincide. A predetermined amount of a water-based acrylic emulsion (product name "ThreeBond 1549" manufactured by ThreeBond Inc.) was dropped onto the coated plate as the adhesive. While scraping off excess adhesive with a squeegee, the adhesive was poured into the through-hole of the coating plate and coated on one side of the substrate (I) so that the coating amount was 40 g/m². After coating, the film was placed in an oven at 120° C. for 10 minutes to dry, forming the resin layer including the pressure-sensitive adhesive layer shown in FIG. 7. In the width direction of the substrate, the distance between two adjacent pressure-sensitive adhesive sections (d41 shown in FIG. 7) was 3.3 mm. In the length direction of the substrate, the distance between two adjacent pressure-sensitive adhesive sections (d42 shown in FIG. 7) was 1 mm. The length of the pressure-sensitive adhesive layer in the length direction (vertical) was 8 mm. The length in the width direction (horizontal) at the other end of the pressure-sensitive adhesive section was 2 mm.

The ratio of the length (length/width) of the pressure-sensitive adhesive section in the length direction (length) to the length in the width direction (width) of the pressure-sensitive adhesive section was 4. The distance between one end of the adhesive and one end of the substrate in the length direction was 2 mm.

Next, release sheet E was used as the release sheet, and the seal member was attached on the pressure-sensitive adhesive layer so that the MD direction of release sheet E overlapped the length direction of the substrate (the direction of the adhesive length).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 1.

Example 7

The seal member was obtained in the same way as in Example 5, except that the substrate (I) was used.

The resulting seal members were subjected to the various evaluations described above. The results are shown in Table 2.

Example 8

A through-hole with a similar shape to the pressure-sensitive adhesive section shown in FIG. 5 was made in plan view on a thick paper of 252 mm long, 252 mm wide, and 390 μm thick, so that the aperture ratio was 27%, and the length direction of the through-hole was aligned with that of the thick paper.

The coating plate was placed on one side of the substrate (II) so that the width direction of the substrate (II) and the horizontal direction of the coating plate coincide, and the length direction of the substrate (II) and the vertical direction of the coating plate coincide. A prescribed amount of aqueous acrylic emulsion (product name "ThreeBond 1549" manufactured by ThreeBond Inc.) was dropped onto the coating plate as the adhesive, and excess adhesive was scraped off with a squeegee, and at the same time the adhesive was poured into the through-hole of the coating plate to make the coating amount 40 g/m$^2$ was applied to one side of the substrate (II) so that the amount of coating was 40 g/m$^2$. After coating, the film was placed in an oven at 120° C. for 10 minutes to dry, forming the resin layer including the pressure-sensitive adhesive layer shown in FIG. 5. The distance in the width direction of the substrate between the pressure-sensitive adhesive section of the first region and the pressure-sensitive adhesive section of the second region adjacent to the first region (d22 shown in FIG. 5) was 4 mm. In the length direction of the substrate, the distance between two adjacent pressure-sensitive adhesive sections (d23 shown in FIG. 5) was 6 mm. The length (vertical) of the pressure-sensitive adhesive section was 8 mm.

The length of the pressure-sensitive adhesive section in the width direction (horizontal, the length of the part that is not a semicircle shape) was 2 mm. The ratio of the length (length/width) of the pressure-sensitive adhesive section in the length direction (length) to the length in the width direction (width) of the pressure-sensitive adhesive section was 4. The distance between one end of the adhesive and one end of the substrate in the length direction was 1 mm.

Next, release sheet E was used as the release sheet, and the seal member was attached on the pressure-sensitive adhesive layer so that the MD direction of release sheet E overlapped the length direction of the substrate (the direction of the adhesive length).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 2.

Example 9

The same pressure-sensitive adhesive layer was provided on the same substrate as in Example 1, except that the distance between one end of the pressure-sensitive adhesive section and one end of the substrate in the length direction was 0.5 mm, and release sheet E was used as the release sheet. The seal member was attached on the pressure-sensitive adhesive layer so that the MD direction of release sheet E overlapped with the length direction of the substrate (length direction of the pressure-sensitive adhesive layer).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 2.

Example 10

The same pressure-sensitive adhesive layer was provided on the same substrate as in Example 1, except that the distance between one end of the pressure-sensitive adhesive section and one end of the substrate in the length direction was 1.0 mm, and release sheet E was used as the release sheet. The seal member was attached on the pressure-sensitive adhesive layer so that the MD direction of release sheet E overlapped with the length direction of the substrate (length direction of the pressure-sensitive adhesive layer).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 2.

Example 11

A through-hole with a similar shape to the pressure-sensitive adhesive section shown in FIG. 4 was made in plan view on a cardboard of 252 mm long, 252 mm wide, and 390 μm thick to achieve an aperture ratio of 28%, and a coating plate was made so that the length direction of the through-hole and that of the cardboard are aligned.

The coating plate was placed on one side of the substrate (II) so that the width direction of the substrate (II) and the horizontal direction of the coating plate coincide, and the length direction of the substrate (II) and the vertical direction of the coating plate coincide. A predetermined amount of a water-based acrylic emulsion (product name "Three-Bond 1549" manufactured by ThreeBond Inc.) was dropped onto the coated plate as the adhesive. While scraping off excess adhesive with a squeegee, the adhesive was poured into the through-hole of the coating plate and coated on one side of the substrate (II) so that the coating amount was 40 g/m². After coating, the film was placed in an oven at 120° C. for 10 minutes to dry, forming the resin layer including the pressure-sensitive adhesive layer shown in FIG. 4. The distance in the width direction of the substrate between the pressure-sensitive adhesive section of the first region and the pressure-sensitive adhesive section of the second region adjacent to the first region (d12 shown in FIG. 4) was 4 mm. In the length direction of the substrate, the distance between two adjacent pressure-sensitive adhesive sections (d13 shown in FIG. 4) was 5 mm. The length (vertical) of the pressure-sensitive adhesive section was 4 mm. The length of the pressure-sensitive adhesive section in the width direction (horizontal) was 3 mm.

The ratio of the length (length/width) of the pressure-sensitive adhesive section in the length direction (length) to the length in the width direction (width) of the pressure-sensitive adhesive section was 1.3. The distance between one end of the adhesive and one end of the substrate in the length direction was 2 mm.

Next, release sheet E was used as the release sheet. The seal member was attached on the pressure-sensitive adhesive layer so that the MD direction of release sheet E overlapped with the length direction of the substrate (adhesive length direction).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 2.

Comparative Example 1

Figure 9:
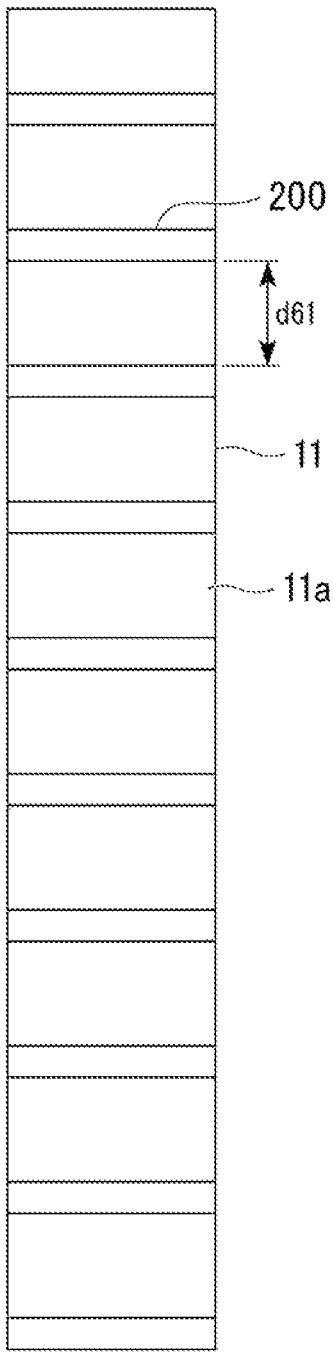
FIG. 9 is a schematic plan view of the pressure-sensitive adhesive layer in Comparative Example 1.

A coating plate was made on cardboard 250 mm long, 252 mm wide, and 525 µm thick, with a through-hole similar in shape to the pressure-sensitive adhesive layer shown in FIG. 9 in plan view so that the aperture ratio is 20%, and the length direction of the through-hole is aligned with the transverse direction of the cardboard.

FIG. 9 is a plan view schematically showing the pressure-sensitive adhesive layer. As shown in FIG. 9, the pressure-sensitive adhesive layer 200 is rectangular in plan view, extending in the width direction of the substrate 11. The pressure-sensitive adhesive layer 200 is arranged in a plurality of discontinuous positions along the length direction of the substrate 11 in plan view. In other words, the pressure-sensitive adhesive layer 200 is arranged in stripes on one side 11*a* of the substrate 11 in plan view.

The coating plate is placed on one side of the substrate (I) so that the width direction of the substrate (I) and the horizontal direction of the coating plate coincide, and the length direction of the substrate (I) and the vertical direction of the coating plate coincide. A predetermined amount of a water-based acrylic emulsion (product name "ThreeBond 1549" manufactured by ThreeBond Inc.) was dropped onto the coated plate as the adhesive. While scraping off excess adhesive with a squeegee, the adhesive was poured into the through-hole of the coating plate and coated on one side of the substrate (I) so that the coating amount was 40 g/m². After coating, the film was placed in an oven at 120° C. for 10 minutes to dry, forming the resin layer including the pressure-sensitive adhesive layer shown in FIG. 9. In the length direction of the substrate, the distance between two adjacent pressure-sensitive adhesive layers (d61 shown in FIG. 9) was 8 mm. The length of the pressure-sensitive adhesive layer in the length direction (vertical) was 2 mm. The ratio (length/width) of the length of the pressure-sensitive adhesive layer in the length direction (length) to the length in the width direction (width) of the pressure-sensitive adhesive layer was 0.2 (the substrate width was 12.5 mm).

The distance between one end of the adhesive and one end of the substrate in the length direction was 2 mm.

Next, release sheet E was used as the release sheet. The seal member was attached on the pressure-sensitive adhesive layer so that the MD direction of release sheet E overlapped with the length direction of the substrate (shortitudinal direction of the pressure-sensitive adhesive section).

The maximum peeling force to peel the release sheet from the resin layer by a tensile load perpendicular to the adhesive surface of the resin layer and the release sheet was 0.17 N/12.5 mm. The Gurley stiffness of the peeled sheet in the length direction was 0.4 mN. The seal member was then cut by a cutting machine to obtain a seal member 12.5 mm wide and 250 mm long.

The resulting seal members were subjected to the various evaluations described above. The results are shown in Table 2.

Comparative Example 2

Figure 10:
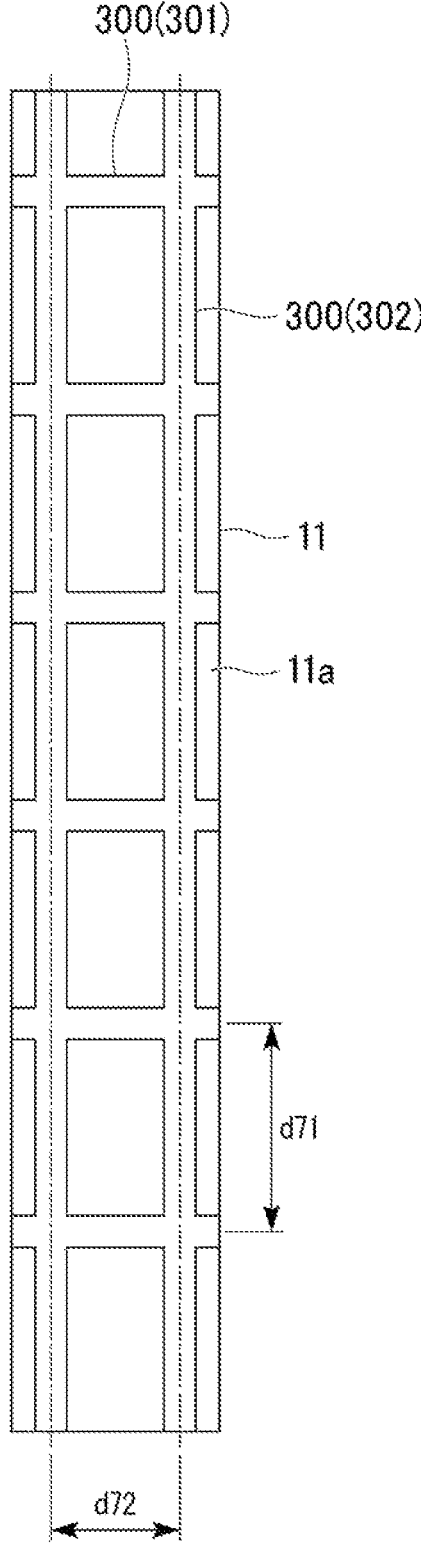
FIG. 10 is a plan view schematically shows the pressure-sensitive adhesive layer in Comparative Example 2.

A through hole similar in shape to the pressure-sensitive adhesive layer shown in FIG. 10 was made in plan view in a cardboard of 252 mm long, 252 mm wide, and 350 µm thick to achieve an aperture ratio of 30%, and a coating plate was made so that the length direction of the rectangular shape of the uncoated pressure-sensitive adhesive layer matches the length direction of the cardboard.

FIG. 10 is a plan view schematically showing the pressure-sensitive adhesive layer. As shown in FIG. 10, the pressure-sensitive adhesive layer 300 is grid-shaped in plan view. In plan view, the pressure-sensitive adhesive layer 300 has a linear first portion 301 that extends in the width direction of the substrate 11 and is arranged in a plurality of discontinuous locations along the length direction of the substrate 11. Furthermore, the pressure-sensitive adhesive layer 300 has two second sites 302 that extend in the length direction of the substrate 11 in plan view and are orthogonal to the first site 301.

The coating plate is placed on one side of the substrate (I) so that the width direction of the substrate (I) and the horizontal direction of the coating plate coincide, and the length direction of the substrate (I) and the vertical direction of the coating plate coincide. A predetermined amount of a water-based acrylic emulsion (product name "ThreeBond 1549" manufactured by ThreeBond Inc.) was dropped onto the coated plate as the adhesive. While scraping off excess adhesive with a squeegee, the adhesive was poured into the through-hole of the coating plate and coated on one side of the substrate (I) so that the coating amount was 40 g/m². After coating, the film was placed in an oven at 120° C. for 10 minutes to dry, forming the resin layer including the pressure-sensitive adhesive layer shown in FIG. 10. In the length direction of the substrate, the distance between the two adjacent first sections 301 (d71 shown in FIG. 10) was 17 mm. The length of the first section 301 in the length direction (vertical) was 2 mm. In the width direction of the substrate, the distance between the two adjacent second sites 302 (d72 shown in FIG. 10) was 9 mm. The length (length-wise) of the second section 302 in the width direction was 2 mm.

The distance between one end of the adhesive and one end of the substrate in the length direction was 2 mm.

Next, release sheet E was used as the release sheet. The seal member was attached on the pressure-sensitive adhesive layer so that the MD direction of release sheet E overlapped with the length direction of the substrate.

The maximum peeling force to peel the release sheet from the resin layer by a tensile load perpendicular to the adhesive surface of the resin layer and the release sheet was 0.15 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 3.

Example 12

A through-hole with a similar shape to the pressure-sensitive adhesive section shown in FIG. 4 was made in plan view on a thick paper of 252 mm long, 252 mm wide, and 390 μm thick to achieve an aperture ratio of 27%, and a coating plate was made so that the length direction of the through-hole and that of the thick paper were aligned.

The coating plate is placed on one side of the substrate (I) so that the width direction of the substrate (I) and the horizontal direction of the coating plate coincide, and the length direction of the substrate (I) and the vertical direction of the coating plate coincide. A predetermined amount of a water-based acrylic emulsion (product name "ThreeBond 1549" manufactured by ThreeBond Inc.) was dropped onto the coated plate as the adhesive. While scraping off excess adhesive with a squeegee, the adhesive was poured into the through-hole of the coating plate and coated on one side of the substrate (I) so that the coating amount was 40 g/m². After coating, the film was placed in an oven at 120° C. for 10 minutes to dry, forming the resin layer including the pressure-sensitive adhesive layer shown in FIG. 4. The distance in the width direction of the substrate between the pressure-sensitive adhesive section of the first region and the pressure-sensitive adhesive section of the second region adjacent to the first region (d12 shown in FIG. 4) was 4 mm. In the length direction of the substrate, the distance between two adjacent pressure-sensitive adhesive sections (d13 shown in FIG. 4) was 5 mm. The length (vertical) of the pressure-sensitive adhesive section was 4 mm. The length of the pressure-sensitive adhesive section in the width direction (horizontal) was 3 mm. The ratio of the length (length/width) of the pressure-sensitive adhesive section to the length (length) of the pressure-sensitive adhesive layer in the width direction (width) was 1.3. The distance between one end of the adhesive and one end of the substrate in the length direction was 2 mm.

Next, release sheet E was used as the release sheet. The seal member was attached on the pressure-sensitive adhesive layer so that the MD direction of release sheet E overlapped with the length direction of the substrate (adhesive length direction).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN. The seal member was then cut by a cutting machine to obtain a seal member 12.5 mm wide and 250 mm long.

The resulting seal members were subjected to the various evaluations described above. The results are shown in Table 3.

Example 13

A resin layer containing the same substrate and pressure-sensitive adhesive layer as in Example 1 was formed.

Next, release sheet E was used as the release sheet. The seal member was attached on the pressure-sensitive adhesive layer so that the MD direction of release sheet E overlapped with the length direction of the substrate (adhesive length direction).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 3.

Example 14

A through-hole with a similar shape to the pressure-sensitive adhesive section shown in FIG. 6 was made in plan view on a cardboard of 252 mm long, 252 mm wide, and 390 μm thick to achieve an aperture ratio of 27%, and a coating plate was made so that the length direction of the through-hole and that of the cardboard are aligned.

The coating plate is placed on one side of the substrate (I) so that the width direction of the substrate (I) and the horizontal direction of the coating plate coincide, and the length direction of the substrate (I) and the vertical direction of the coating plate coincide. A predetermined amount of a water-based acrylic emulsion (product name "ThreeBond 1549" manufactured by ThreeBond Inc.) was dropped onto the coated plate as the adhesive. While scraping off excess adhesive with a squeegee, the adhesive was poured into the through-hole of the coating plate and coated on one side of the substrate (I) so that the coating amount was 40 g/m². After coating, the film was placed in an oven at 120° C. for 10 minutes to dry, forming the resin layer including the pressure-sensitive adhesive layer shown in FIG. 6. The distance in the width direction of the substrate between the pressure-sensitive adhesive section of the first region and the pressure-sensitive adhesive section of the second region adjacent to the first region (d32 shown in FIG. 6) was 4 mm. In the length direction of the substrate, the distance between two adjacent pressure-sensitive adhesive sections (d33 shown in FIG. 6) was 6 mm. The length (vertical) of the pressure-sensitive adhesive section was 8 mm. The length of the pressure-sensitive adhesive section in the width direction was 2 mm. The ratio of the length (length/width) of the pressure-sensitive adhesive section in the length direction (length) to the length in the width direction (width) of the pressure-sensitive adhesive section was 4. The distance between one end of the adhesive and one end of the substrate in the length direction was 2 mm.

Next, release sheet E was used as the release sheet. The seal member was attached on the pressure-sensitive adhesive layer so that the MD direction of release sheet E overlapped with the length direction of the substrate (adhesive length direction).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 3.

Example 15

A through-hole with a similar shape to the pressure-sensitive adhesive section shown in FIG. 8 was made in plan view on a cardboard of 252 mm long, 252 mm wide, and 460 μm thick to achieve an aperture ratio of 23%, and a coating plate was made so that the length direction of the through-hole and that of the cardboard are aligned.

The coating plate is placed on one side of the substrate (I) so that the width direction of the substrate (I) and the horizontal direction of the coating plate coincide, and the length direction of the substrate (I) and the vertical direction of the coating plate coincide. A predetermined amount of a water-based acrylic emulsion (product name "ThreeBond 1549" manufactured by ThreeBond Inc.) was dropped onto the coated plate as the adhesive. While scraping off excess adhesive with a squeegee, the adhesive was poured into the through-hole of the coating plate and coated on one side of the substrate (I) so that the coating amount was 40 g/m². After coating, the film was placed in an oven at 120° C. for 10 minutes to dry, forming the resin layer including the pressure-sensitive adhesive layer shown in FIG. 8. In the width direction of the substrate, the distance between two adjacent pressure-sensitive adhesive sections (d51 shown in FIG. 8) was 6.5 mm. The length of the pressure-sensitive adhesive section in the width direction (horizontal) was 1.5 mm. The ratio of the length (length/width) of the pressure-sensitive adhesive section to the length (length) of the pressure-sensitive adhesive section in the width direction (width) was 665.3. The distance between one end of the adhesive and one end of the substrate in the length direction was 2 mm.

Next, release sheet E was used as the release sheet. The seal member was attached on the pressure-sensitive adhesive layer so that the MD direction of release sheet E overlapped with the length direction of the substrate (adhesive length direction).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 3.

Example 16

A resin layer containing the same substrate and pressure-sensitive adhesive layer as in Example 1 was formed, except that the distance between one end of the pressure-sensitive adhesive layer and one end of the substrate in the length direction was 5 mm.

Next, release sheet E was used as the release sheet. The seal member was attached on the pressure-sensitive adhesive layer so that the MD direction of release sheet E overlapped with the length direction of the substrate (adhesive length direction).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 3.

Example 17

The seal member was obtained in the same way as in Example 16, except that the maximum peeling force described above was 0.09 N/12.5 mm, the Gurley stiffness described above was 0.4 mN, and the distance between one end of the pressure-sensitive adhesive layer in the length direction and one end of the substrate in the length direction was 6 mm.

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 3.

Example 18

Release sheet F was used as the release sheet. The seal member was obtained in the same way as in Example 1, except that the release sheet F was attached on the pressure-sensitive adhesive layer so that the MD direction of the release sheet F overlapped the length direction of the substrate (the direction of the adhesive length).

The maximum peeling force to peel the release sheet from the resin layer by a tensile load perpendicular to the adhesive surface of the resin layer and the release sheet was 0.12 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 4.

Example 19

Release sheet G was used as the release sheet. The seal member was obtained in the same way as in Example 1, except that the release sheet G was attached on the pressure-sensitive adhesive layer so that the MD direction of the release sheet G overlapped the length direction of the substrate (adhesive length direction).

The maximum peeling force to peel the release sheet from the resin layer by a tensile load perpendicular to the adhesive surface of the resin layer and the release sheet was 0.14 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 4.

Example 20

The substrate (II) was used, and release sheet F was used as the release sheet. The seal member was obtained in the same way as in Example 1, except that the release sheet F was attached on the pressure-sensitive adhesive layer so that the MD direction of the release sheet F overlapped the length direction of the substrate (the direction of the adhesive length).

The maximum peeling force to peel the release sheet from the resin layer by a tensile load perpendicular to the adhesive surface of the resin layer and the release sheet was 0.12 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 4.

Example 21

Release sheet H was used as the release sheet. The seal member was obtained in the same way as in Example 1, except that it was attached on the pressure-sensitive adhesive layer so that the CD direction of the release sheet H overlapped the length direction of the substrate (the direction of the adhesive length).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.5 mN.

The seal member was then cut by a cutting machine to obtain a seal member 12.5 mm wide and 250 mm long.

The resulting seal members were subjected to the various evaluations described above. The results are shown in Table 4.

Example 22

Release sheet I was used as the release sheet. The seal member was obtained in the same way as in Example 1, except that it was attached on the pressure-sensitive adhesive layer so that the MD direction of the release sheet I overlapped the length direction of the substrate (the direction of the adhesive length).

The maximum peeling force to peel the release sheet from the resin layer by a tensile load perpendicular to the adhesive surface of the resin layer and the release sheet was 0.09 N/12.5 mm. The Gurley stiffness of the peeled sheet in the length direction was 0.8 mN.

The seal member was then cut by a cutting machine to obtain a seal member 12.5 mm wide and 250 mm long.

The resulting seal members were subjected to the various evaluations described above. The results are shown in Table 4.

Example 23

Polyvinyl alcohol (product name "GOHSEFIMER T-350" manufactured by Mitsubishi Chemical Corporation) was dissolved in water to prepare a coating solution at a concentration of 10.5% by mass.

The coating solution was applied to one side of the substrate (I) using a 10 mm diameter round bar (without wire winding) and dried at 100° C. for 5 minutes to form an undercoat layer with a basis weight of 20 $g/m^2$. A resin layer including the same pressure-sensitive adhesive layer as in Example 1 was formed on the undercoat layer.

Next, release sheet E was used as the release sheet. The seal member was attached on the pressure-sensitive adhesive layer so that the MD direction of release sheet E as the release sheet overlapped the length direction of the substrate (adhesive length direction).

The maximum peeling force to peel the release sheet from the resin layer by a tensile load perpendicular to the adhesive surface of the resin layer and the release sheet was 0.10 N/12.5 mm. The Gurley stiffness of the peeled sheet in the length direction was 0.4 mN.

The seal member was then cut by a cutting machine to obtain a seal member 12.5 mm wide and 250 mm long.

The resulting seal members were subjected to the various evaluations described above. The results are shown in Table 4.

The types of release sheets are also shown in Table 5.

TABLE 1

| | Factors and evaluation results | | Example 1 | Example 2 | Example 3 | Example 4 | Example 5 | Example 6 |
|---|---|---|---|---|---|---|---|---|
| Substrate | Basis weight of organic components ($g/m^2$) | | 150 | 150 | 150 | 150 | 220 | 150 |
| | Basis weight of inorganic components ($g/m^2$) | | 1850 | 1850 | 1850 | 1850 | 1780 | 1850 |
| | Basis weight of substrate ($g/m^2$) | | 2000 | 2000 | 2000 | 2000 | 2000 | 2000 |
| Resin layer | Undercoat layer | Basis weight of organic components ($g/m^2$) | — | — | — | — | — | — |
| | Pressure-sensitive adhesive layer | Shape | FIG. 5 | FIG. 5 | FIG. 5 | FIG. 5 | FIG. 3 | FIG. 7 |
| | | Aspect ratio of adhesive section in peel direction | 4 | 4 | 4 | 4 | 4 | 4 |
| | | Clearance between edge of substrate and edge of adhesive section | 2 | 2 | 2 | 2 | 2 | 2 |
| | | $I_i \le I_m$ ? | $I_i < I_m$ | $I_i < I_m$ | $I_i < I_m$ | $I_i < I_m$ | $I_i < I_m$ | $I_i < I_m$ |
| | | Maximum peeling force required to peel off the release sheet in the peeling direction (N/12.5 mm) | 0.06 | 0.06 | 0.06 | 0.06 | 0.11 | 0.09 |

TABLE 1-continued

| | Factors and evaluation results | Example 1 | Example 2 | Example 3 | Example 4 | Example 5 | Example 6 |
|---|---|---|---|---|---|---|---|
| | Basis weight of organic components (g/m²) | 40 | 40 | 40 | 40 | 40 | 40 |
| | Total basis weight of organic components (g/m²) | 40 | 40 | 40 | 40 | 40 | 40 |
| Release sheet | Gurley stiffness of release sheet in peeling direction (mN) | 0.2 | 0.3 | 0.4 | 0.4 | 0.4 | 0.4 |
| | Release paper type | A | B | C | D | E | E |
| Evaluation | Incombustibility | AA | AA | AA | AA | B | AA |
| | Intralayer peeling | AA | AA | AA | AA | AA | AA |
| | Adhesive layer detachment | AA | AA | AA | AA | A | AA |
| | Adhesive layer detachment ratio | 0 | 0 | 0 | 0.5 | 1.5 | 0.8 |
| | Adhesiveness | AA | AA | AA | AA | AA | AA |
| | Peelability of release sheet | AA | AA | AA | AA | AA | AA |
| | Peelability of release paper | AA | AA | B | AA | AA | AA |
| | Workability of release paper adhesion | B | A | AA | AA | AA | AA |
| | Total evaluation | B | A | B | AA | B | AA |

TABLE 2

| | Factors and evaluation results | | Example 7 | Example 8 | Example 9 | Example 10 | Example 11 | Comparative Example 1 |
|---|---|---|---|---|---|---|---|---|
| Substrate | Basis weight of organic components (g/m²) | | 150 | 220 | 150 | 150 | 220 | 150 |
| | Basis weight of inorganic components (g/m²) | | 1850 | 1780 | 1850 | 1850 | 1780 | 1850 |
| | Basis weight of substrate (g/m²) | | 2000 | 2000 | 2000 | 2000 | 2000 | 2000 |
| Resin layer | Undercoat layer | Basis weight of organic components (g/m²) | — | — | — | — | — | — |
| | Pressure-sensitive adhesive layer | Shape | FIG. 3 | FIG. 5 | FIG. 5 | FIG. 5 | FIG. 4 | FIG. 9 |
| | | Aspect ratio of adhesive section in peel direction | 4 | 4 | 4 | 4 | 1.3 | 0.2 |
| | | Clearance between edge of substrate and edge of adhesive section | 2 | 1 | 0.5 | 1 | 2 | 2 |
| | | $I_i \leq I_m$ ? | $I_i < I_m$ | $I_i < I_m$ | $I_i < I_m$ | $I_i < I_m$ | $I_i < I_m$ | $I_i < I_m$ |
| | | Maximum peeling force required to peel off the release sheet in the peeling direction (N/12.5 mm) | 0.11 | 0.09 | 0.09 | 0.09 | 0.09 | 0.17 |
| | | Basis weight of organic components (g/m²) | 40 | 40 | 40 | 40 | 40 | 40 |
| | Total basis weight of organic components (g/m²) | | 40 | 40 | 40 | 40 | 40 | 40 |
| Release sheet | Gurley stiffness of release sheet in peeling direction (mN) | | 0.4 | 0.4 | 0.4 | 0.4 | 0.4 | 0.4 |
| | Release paper type | | E | E | E | E | E | E |
| Evaluation | Incombustibility | | AA | B | AA | AA | B | AA |
| | Intralayer peeling | | AA | A | B | A | AA | AA |
| | Adhesive layer detachment | | A | AA | AA | AA | A | C |
| | Adhesive layer detachment ratio | | 1.2 | 0.8 | 0.8 | 0.8 | 1.7 | 20.0 |
| | Adhesiveness | | AA | AA | AA | AA | AA | AA |
| | Peelability of release sheet | | AA | AA | AA | AA | AA | AA |
| | Peelability of release paper | | AA | AA | AA | AA | AA | AA |
| | Workability of release paper adhesion | | AA | AA | AA | AA | AA | AA |
| | Total evaluation | | A | B | B | A | B | C |

TABLE 3

| | Factors and evaluation results | | Comparative Example 2 | Example 12 | Example 13 | Example 14 | Example 15 | Example 16 | Example 17 |
|---|---|---|---|---|---|---|---|---|---|
| Substrate | Basis weight of organic components (g/m²) | | 150 | 150 | 150 | 150 | 150 | 150 | 150 |
| | Basis weight of inorganic components (g/m²) | | 1850 | 1850 | 1850 | 1850 | 1850 | 1850 | 1850 |
| | Basis weight of substrate (g/m²) | | 2000 | 2000 | 2000 | 2000 | 2000 | 2000 | 2000 |
| Resin layer | Undercoat layer | Basis weight of organic components (g/m²) | — | — | — | — | — | — | — |
| | Pressure-sensitive adhesive layer | Shape | FIG. 10 | FIG. 4 | FIG. 5 | FIG. 6 | FIG. 8 | FIG. 5 | FIG. 5 |
| | | Aspect ratio of adhesive section in peel direction | — | 1.3 | 4 | 4 | 665.3 | 4 | 4 |
| | | Clearance between edge of substrate and edge of adhesive section | 2 | 2 | 2 | 2 | 2 | 5 | 6 |

TABLE 3-continued

| Factors and evaluation results | | Comparative Example 2 | Example 12 | Example 13 | Example 14 | Example 15 | Example 16 | Example 17 |
|---|---|---|---|---|---|---|---|---|
| | $I_i \leq I_m$ ? | $I_i < I_m$ | $I_i < I_m$ | $I_i < I_m$ | $I_i < I_m$ | $I_i < I_m$ | $I_i < I_m$ | $I_i \leq I_m$ |
| | Maximum peeling force required to peel off the release sheet in the peeling direction (N/12.5 mm) | 0.15 | 0.09 | 0.09 | 0.09 | 0.09 | 0.09 | 0.09 |
| | Basis weight of organic components (g/m²) | 40 | 40 | 40 | 40 | 40 | 40 | 40 |
| | Total basis weight of organic components (g/m²) | 40 | 40 | 40 | 40 | 40 | 40 | 40 |
| Release sheet | Gurley stiffness of release sheet in peeling direction (mN) | 0.4 | 0.4 | 0.4 | 0.4 | 0.4 | 0.4 | 0.4 |
| | Release paper type | E | E | E | E | E | E | E |
| Evaluation | Incombustibility | AA | AA | AA | AA | AA | AA | AA |
| | Intralayer peeling | AA | AA | AA | AA | AA | AA | AA |
| | Adhesive layer detachment | C | A | AA | AA | AA | AA | AA |
| | Adhesive layer detachment ratio | 15.0 | 1.7 | 0.8 | 0.8 | 0 | 0.8 | 0.8 |
| | Adhesiveness | AA | AA | AA | AA | AA | AA | AA |
| | Peelability of release sheet | AA | AA | AA | AA | AA | A | B |
| | Peelability of release paper | AA | AA | AA | AA | AA | AA | AA |
| | Workability of release paper adhesion | AA | AA | AA | AA | AA | AA | AA |
| | Total evaluation | C | A | AA | AA | AA | A | B |

TABLE 4

| Factors and evaluation results | | | Example 18 | Example 19 | Example 20 | Example 21 | Example 22 | Example 23 |
|---|---|---|---|---|---|---|---|---|
| Substrate | | Basis weight of organic components (g/m²) | 150 | 150 | 220 | 150 | 220 | 150 |
| | | Basis weight of inorganic components (g/m²) | 1850 | 1850 | 1780 | 1850 | 1850 | 1850 |
| | | Basis weight of substrate (g/m²) | 2000 | 2000 | 2000 | 2000 | 2000 | 2000 |
| Resin layer | Undercoat layer | Basis weight of organic components (g/m²) | — | — | — | — | — | — |
| | Pressure-sensitive adhesive layer | Shape | FIG. 5 | FIG. 5 | FIG. 5 | FIG. 5 | FIG. 5 | FIG. 5 |
| | | Aspect ratio of adhesive section in peel direction | 4 | 4 | 4 | 4 | 4 | 4 |
| | | Clearance between edge of substrate and edge of adhesive section | 2 | 2 | 2 | 2 | 2 | 2 |
| | | $I_i \leq I_m$ ? | $I_i < I_m$ | $I_i < I_m$ | $I_i < I_m$ | $I_i < I_m$ | $I_i < I_m$ | $I_i < I_m$ |
| | | Maximum peeling force required to peel off the release sheet in the peeling direction (N/12.5 mm) | 0.12 | 0.14 | 0.12 | 0.09 | 0.09 | 0.10 |
| | | Basis weight of organic components (g/m²) | 40 | 40 | 40 | 40 | 40 | 40 |
| | | Total basis weight of organic components (g/m²) | 40 | 40 | 40 | 40 | 40 | 60 |
| Release sheet | | Gurley stiffness of release sheet in peeling direction (mN) | 0.4 | 0.4 | 0.4 | 0.5 | 0.8 | 0.4 |
| | | Release paper type | F | G | F | H | I | E |
| Evaluation | | Incombustibility | AA | AA | B | AA | AA | AA |
| | | Intralayer peeling | AA | AA | AA | AA | AA | AA |
| | | Adhesive layer detachment | A | B | A | AA | AA | AA |
| | | Adhesive layer detachment ratio | 2.0 | 5.0 | 2.0 | 0.8 | 0.8 | 0.8 |
| | | Adhesiveness | AA | AA | AA | AA | AA | AA |
| | | Peelability of release sheet | AA | AA | AA | AA | AA | AA |
| | | Peelability of release paper | AA | AA | AA | A | B | AA |
| | | Workability of release paper adhesion | AA | AA | AA | AA | AA | AA |
| | | Total evaluation | A | B | B | A | B | AA |

TABLE 5

| | | Maximum peeling force of release sheet (N/50 mm) | | | | |
|---|---|---|---|---|---|---|
| | | 0.5 | 0.8 | 1.0 | 1.2 | 1.4 |
| Gurley stiffness of release sheet (mN) | 0.2 | | A | | | |
| | 0.3 | | B | | | |
| | 0.4 | C | D | E | F | G |
| | 0.5 | | H | | | |
| | 0.8 | | I | | | |

As shown in Tables 1 through 4, the seal members obtained in each case were excellent in terms of nonflammability, peeling within the layer, pressure-sensitive adhesive layer removal, adhesion, floating during bonding, peeling, and release sheet bonding workability.

On the other hand, as shown in Table 2 and Table 3, the seal members of Comparative Examples 1 and 2 were inferior in pressure-sensitive adhesive layer removal.

REFERENCE SIGNS LIST

10 Seal member
11 Substrate
12 Resin layer
121 Pressure-sensitive adhesive layer
121A Pressure-sensitive adhesive section
121B First pressure-sensitive adhesive section row
121C Second pressure-sensitive adhesive section row
121D Third pressure-sensitive adhesive section row
13 Release sheet

What is claimed is:

1. A seal member formed in a strip shape having a long side extending in a length direction and a short side extending in a width direction in plan view, the seal member comprising:
   a substrate;
   a resin layer formed on one surface of the substrate; and
   a release sheet provided on the resin layer,
   wherein the resin layer includes a pressure-sensitive adhesive layer,
      the pressure-sensitive adhesive layer has a plurality of pressure-sensitive adhesive section rows, each pressure-sensitive adhesive section row of the plurality of pressure-sensitive adhesive section rows includes at least one pressure-sensitive adhesive section extending in the length direction of the substrate,
      the plurality of pressure-sensitive adhesive section rows are separated from each other in the width direction of the substrate such that a first end of each pressure-sensitive adhesive section row of the plurality of pressure-sensitive adhesive section rows in the length direction is separated from a first end of the substrate in the length direction,
   a distance between a first end of a first pressure-sensitive adhesive section row of an adjacent pair of pressure-sensitive adhesive section rows and the first end of the substrate in the length direction is (A), a distance between a first end of a second pressure-sensitive adhesive section row of the adjacent pair of pressure-sensitive adhesive section rows and the first end of the substrate in the length direction is (B), and (A) and (B) satisfy a relationship of (B)<(A),
   a ratio of a length of each pressure-sensitive adhesive section row of the plurality of pressure-sensitive adhesive section rows in the length direction to a width of each of the pressure sensitive adhesive section row of the plurality of pressure-sensitive adhesive section rows in the width direction is 1.3 or more, and
   a maximum peeling force to peel the release sheet from the resin layer by a tensile load perpendicular to an adhesive surface provided by the pressure-sensitive adhesive layer is 0.06 N/12.5 mm or more and 0.14 N/12.5 mm or less.

2. The seal member according to claim 1, wherein the at least one pressure-sensitive adhesive section is a continuous pressure-sensitive adhesive section or two or more pressure-sensitive adhesive sections, and each pressure-sensitive adhesive section row of the plurality of pressure-sensitive adhesive section rows independently comprises the continuous pressure-sensitive adhesive section elongating in the length direction of the substrate, or the two or more pressure-sensitive adhesive sections aligning in the length direction of the substrate.

3. The seal member according to claim 1, wherein in at least one pair of adjacent pressure-sensitive adhesive section rows among the plurality of pressure-sensitive adhesive section rows, the at least one pressure-sensitive adhesive section of one row, of the at least one pair of the adjacent pressure-sensitive adhesive section rows, at least partially overlaps the at least one pressure-sensitive adhesive section of an adjacent other row of the at least one pair of the adjacent pressure-sensitive adhesive section rows in the width direction of the substrate.

4. The seal member according to claim 1, wherein a ratio (length/width) of the length of the pressure-sensitive adhesive section in the length direction to the width of the pressure-sensitive adhesive section in the width direction is 1.3 or more and 999 or less.

5. The seal member according to claim 1, wherein the distance (B) between the first end of the second pressure-sensitive adhesive section row of the adjacent pair of pressure-sensitive adhesive section rows and the first end of the substrate in the length direction is 1 mm or more and 5 mm or less, and
   the first end of the second pressure-sensitive adhesive section row of the adjacent pair of pressure-sensitive adhesive section rows is closest to the first end of the substrate.

6. The seal member according to claim 1, wherein, a length of a pressure-sensitive adhesive section of the at least one pressure-sensitive adhesive section in the width direction is $l_i$ at a first end of the pressure-sensitive adhesive section in the length direction,
   a length of the pressure-sensitive adhesive section in the width direction is $l_m$ at a center of the pressure-sensitive adhesive section in the length direction, and
   the $l_i$ and the $l_m$ satisfy a relationship of formula (1) as follows:

$$l_i \leq l_m \tag{1}$$

wherein i and m respectively indicate a position of the first end and a position of the center.

7. The seal member according to claim 1, wherein Gurley stiffness of the release sheet in the length direction is 0.3 mN or more and 0.5 mN or less.

8. The seal member according to claim 1, wherein the substrate contains an inorganic component and an organic component.

9. The seal member according to claim 8, wherein with a mass of the substrate being 100 parts by mass, a mass of the inorganic component in the substrate is 90 parts by mass or more and 94 parts by mass or less.

10. The seal member according to claim 8, wherein a basis weight of the inorganic component in the substrate is 1800 g/m² or more and 1880 g/m² or less.

11. The seal member according to claim 8, wherein with a mass of the substrate being 100 parts by mass, a mass of the organic component in the substrate is 6 parts by mass or more and 10 parts by mass or less.

12. The seal member according to claim 8, wherein a basis weight of the organic component in the substrate is 120 g/m² or more and 200 g/m² or less.

* * * * *